(12) United States Patent
Weismann et al.

(10) Patent No.: US 11,718,381 B2
(45) Date of Patent: Aug. 8, 2023

(54) TRANSMISSION FOR HYBRID PROPULSION SYSTEM

(71) Applicant: Ockerman Automation Consulting, Inc., Anacortes, WA (US)

(72) Inventors: Patrick Weismann, Newport News, VA (US); Jennifer Michaeli, Smithfield, VA (US); Alden Nelson, Norfolk, VA (US)

(73) Assignee: Ockerman Automation Consulting, Inc., Anacortes, WA (US)

( * ) Notice: Subject to any disclaimer, the term of this patent is extended or adjusted under 35 U.S.C. 154(b) by 333 days.

(21) Appl. No.: 16/838,974

(22) Filed: Apr. 2, 2020

(65) Prior Publication Data

US 2021/0309336 A1    Oct. 7, 2021

(51) Int. Cl.
| | |
|---|---|
| *B63H 23/10* | (2006.01) |
| *F16D 21/06* | (2006.01) |
| *F16D 15/00* | (2006.01) |
| *B63H 21/17* | (2006.01) |
| *B63H 23/30* | (2006.01) |
| *F16D 23/12* | (2006.01) |
| *F16D 41/06* | (2006.01) |
| *F16D 121/14* | (2012.01) |
| *B60K 6/26* | (2007.10) |

(52) U.S. Cl.
CPC ............. *B63H 23/10* (2013.01); *B63H 21/17* (2013.01); *B63H 23/30* (2013.01); *F16D 15/00* (2013.01); *F16D 21/06* (2013.01); *F16D 23/12* (2013.01); *F16D 41/06* (2013.01); *B60K 2006/262* (2013.01); *F16D 2021/0607* (2013.01); *F16D 2121/14* (2013.01)

(58) Field of Classification Search
CPC ........ B63H 23/10; B63H 23/12; B63H 23/14; B63H 23/16; F16D 21/06; F16D 2021/0607
See application file for complete search history.

(56) References Cited

U.S. PATENT DOCUMENTS

| | | | |
|---|---|---|---|
| 8,453,817 B2* | 6/2013 | Schrage | F16D 25/123 310/78 |
| 2006/0144665 A1* | 7/2006 | Janson | F16D 25/10 192/48.8 |
| 2009/0186537 A1* | 7/2009 | Hultsch | B63H 23/12 440/75 |

(Continued)

FOREIGN PATENT DOCUMENTS

| | | | | |
|---|---|---|---|---|
| WO | 2010115804 A2 | 10/2010 | | |
| WO | WO-2010115804 A2 * | 10/2010 | ............. | B63H 21/14 |
| WO | 2012042137 A1 | 4/2012 | | |

OTHER PUBLICATIONS

International Search Report and Written Opinion for PCT Application No. PCT/US2021/025652, dated Jun. 21, 2021.

*Primary Examiner* — Andrew Polay
(74) *Attorney, Agent, or Firm* — Dorsey & Whitney LLP

(57) ABSTRACT

A transmission system for a hybrid power plant, such as a hybrid propulsion system of a marine vessel, is described. The transmission is configured to selectively couple a primary mover and/or a secondary mover to an output of the transmission for providing a power output, and optionally selectively couple the primary mover to the secondary mover, decoupling the output, for electrical energy generation in a compact and light-weight design.

24 Claims, 24 Drawing Sheets

(56) References Cited

U.S. PATENT DOCUMENTS

| | | | |
|---|---|---|---|
| 2009/0209146 A1* | 8/2009 | Jegel | B63H 23/12 |
| | | | 903/904 |
| 2012/0053011 A1 | 3/2012 | Onomura et al. | |
| 2012/0178569 A1 | 7/2012 | Grochowski et al. | |
| 2016/0114877 A1 | 4/2016 | Hedlund | |
| 2018/0238401 A1* | 8/2018 | Lorenz | F16D 21/06 |

* cited by examiner

TRANSMISSION FOR HYBRID PROPULSION SYSTEM

TECHNICAL FIELD

The present disclosure generally relates to a transmission system for a hybrid power plant such as a hybrid propulsion system of a marine vessel.

BACKGROUND

Marine vessels (also referred to as boats or watercraft) have a propulsion system that is typically fuel driven, for example using one or more combustion engines powered by fuel. Marine vessels may use, alternatively or in combination with combustion machinery, a nuclear power plant, fuel cell or electric motor to provide power for their propulsion needs. Electrically driven propulsion systems can be found in limited use in small to medium sized watercraft, and are typically utilized on large diesel-electric ships. Hybrid (e.g., fuel-plus-electric) powertrains are not yet common in small watercraft due to challenges with integrating two power sources in the allowable weight and space allocations to meet operational requirements. For example, it may be challenging to effectively implement a hybrid propulsion system particularly in high-performance small to medium marine watercraft because the addition of another type of power source and associated mover may add weight and complexity from additional ancillary equipment and to the transmission that couples the movers to the propulsors of the vessel, which may adversely impact the performance of the vessel.

A traditional transmission typically uses a clutch and gears to transmit power from the prime mover to the propulsors (e.g., a shaft-driven propeller or impeller) for forward rotation of the shaft. A separate clutch and gear set is typically required to provide reverse rotation of the shaft, which adds to the size and weight of the transmission system. Adding an additional power source (e.g., electric drive) to provide a hybrid propulsion system, may involve using an externally mounted electric motor which is coupled to a secondary input of the transmission and an additional clutch and/or gears may be required for the secondary power source, which may result in a larger assembly that adds weight and consumes valuable space on the vessel that could otherwise be used, e.g., by other machinery of the vessel. Therefore, designers and manufacturers of hybrid power plants, for example for marine propulsion systems, continue to seek improvements thereto.

SUMMARY

In accordance with some embodiments of the present disclosure, a transmission assembly for a hybrid power plant, such as a hybrid propulsion system of a marine vessel, may include a first rotor driven by a primary mover to rotate about a first axis, a second rotor co-axial with the first input rotor and driven by a secondary mover to rotate about the first axis, and an output rotor co-axial with the first and second rotors and configured to selectively engage the first rotor or the second rotor to rotate about the first axis responsive to input from either the primary mover or the secondary mover. The transmission assembly may also include a clutch positioned between the first and second rotors and the output rotor and configured to selectively couple the first rotor or the second rotor to the output rotor. In some embodiments, the transmission assembly may include a shifter rod connected to the clutch to shift the clutch between a first configuration in which the output rotor is coupled, and thus rotates responsive, to the first input rotor and a second configuration in which the output rotor is decoupled from the first input rotor but is coupled, and thus rotates responsive, to the second input rotor. In some embodiments, the shifter rod extends along the first axis, and optionally passes through the output rotor. For example, in some embodiments, the first rotor and the output rotor are spaced apart from one another with a second side of the first rotor facing a first side of the output rotor, and the shifter rod extends from a second side of the output rotor through a central passage in the output rotor to the first side of the output rotor for operatively connecting to the clutch. In some embodiments, the clutch includes an input side selector and an output side selector, and the shifter rod includes a first rod connected to the input side selector and a second rod connected to the second side selector. In some embodiments, the second rod is inserted into the first rod.

In some embodiments, the output rotor is rotatable in a first direction responsive to input from the first rotor, the second rotor, or both, and wherein the output rotor is rotatable in a second direction opposite the first direction only responsive to input from the second rotor. In some embodiments, the output rotor is configured to be decoupled, in at least one mode, from the first rotor such that the second rotor drives the rotation of the output rotor independent of the first rotor in either the first direction or the second direction. In some embodiments, the secondary mover is an electric motor-generator, and wherein the clutch is configured to couple the first rotor to the output rotor to drive the output rotor responsive to rotation of the first rotor while also coupling the second rotor to the rotation of the first rotor for generating electrical energy by the electric motor-generator responsive to rotation of the first rotor.

In some embodiments, the first rotor has an input drum surface, wherein the output rotor has an output drum surface, wherein the clutch comprises a cam having an input cam surface and an output cam surface, the input cam surface facing the input drum surface and the output cam surface facing the output drum surface. In some embodiments, the clutch further comprises an input selector having an input follower positioned between the input drum surface and the input cam surface, the input follower movable by the input selector between a first input configuration in which the input drum surface is rotatable relative to the input cam surface and a second input configuration in which rotation of the input drum surface causes rotation of the input cam surface. In some embodiments, the clutch further comprises an output selector having an output follower positioned between the output drum surface and the output cam surface, the output follower movable by the output selector between a first output configuration in which the output cam surface is rotatable relative to the output drum surface and a second output configuration in which rotation of the output cam surface causes rotation of the output drum surface. In some embodiments, each of the input and followers comprises a plurality of rollers circumferentially spaced around the respective input or output cam surface. In some embodiments, the input selector comprises a first rod and the output selector comprises a second rod axially aligned with the first rod. In some embodiments, the second rod extending at least partially through a length of the first rod. In some embodiments, the cam is fixed to the second rotor such that the cam rotates in synchrony with the second rotor.

A marine vessel having a hybrid propulsion system according to some embodiments herein may include a primary mover located within a hull of the vessel and powered by a first energy source, the primary mover having a shaft that rotates about a first axis. The marine vessel may further include a secondary mover powered by a second energy source different from the first energy source. In some embodiments, the primary mover may be a combustion engine and the secondary mover may be an electric motor. The marine vessel may also include a transmission assembly that includes a first rotor coupled to the shaft of the primary mover to rotate in synchrony with the shaft, a second rotor selectively driven by the secondary mover and co-axial with the first rotor, an output rotor co-axial with the first and second rotors, and a clutch positioned between the first and second rotors and the output rotor to selectively couple the first rotor, the second rotor, or both, to the output rotor. In some embodiments, the first rotor and the second rotor are at least partially enclosed within the same housing (e.g., the housing that also encloses the clutch). In some embodiments, the clutch, in a first configuration, couples the first rotor to the output rotor while simultaneously decoupling the second rotor from the output rotor. In some embodiments, the clutch, in a second configuration, couples the second rotor to the output rotor while simultaneously decoupling the first rotor from the output rotor. In some embodiments, the clutch, in a third configuration, couples the first rotor, the second rotor, and the output rotor such that each of the first, second, and output rotors rotate together.

The above summary of the present invention is not intended to describe each embodiment or every implementation of the present invention. The figures and the detailed description that follow more particularly exemplify one or more preferred embodiments.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
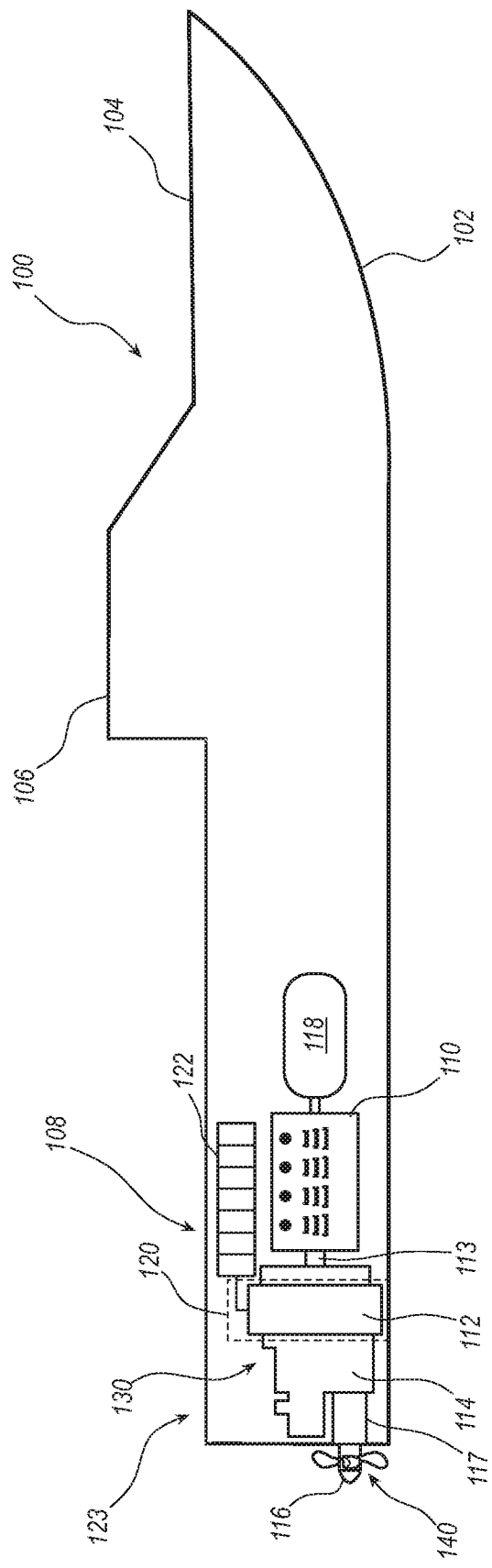
FIG. 1 is a simplified illustration of a marine vessel having a hybrid propulsion system in accordance with the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure generally relates to a transmission assembly (or simply transmission) for a hybrid power plant, for example a hybrid propulsion system for a vehicle or vessel, such as a marine vessel. The term hybrid, when describing a power plant, for example, of a vessel, implies that the system has at least two driven inputs, each being driven by a respective mover, for example a prime (or primary) mover and a second (or secondary) mover. The examples herein may apply to combining the inputs, in a hybrid system, of any two or more suitable movers, which are machines that convert one form of energy (e.g., stored chemical energy in fossil fuel or electrical energy in batteries) into mechanical energy thereby imparting motion. The different movers in a hybrid system may be powered by different types of power sources. For example, the prime (or primary) mover may be a fuel-powered mover, such as a combustion engine that is powered by fuel, a nuclear-fuel powered reactor that drives a turbine, or other. A second mover (e.g., a secondary mover) may be powered by a different type of energy (e.g., electrical energy). For example, the secondary mover may be an electric motor, which is powered by electrical energy that may be stored (e.g., in batteries, capacitors, etc.) and/or harvested from the environment (e.g., through wind, hydro, or solar power harvesting and conversion). Existing transmission assemblies that couple mechanical energy from two different sources to a single mechanical output (e.g., a rotating shaft of a propulsor) typically use two separate input shafts, one associated with each of the mechanical inputs. The present disclosure describes a hybrid transmission which combines or integrates the two inputs for a more compact and more light-weight design. A transmission assembly according to the present disclosure eliminates the need for a second clutch (e.g., one associated with the secondary input, as needed in conventional systems to selectivity couple and decouple the secondary input to the output of the transmission system), thereby reducing the weight of the system.

A power plant according to the present disclosure may serve as the propulsion system of a vessel, such as the marine vessel 100 illustrated in FIG. 1. The power plant may be a hybrid power plant in that it may combine two different mechanical inputs into a single mechanical output. For example the power plant may be a hybrid fuel-electric system. While some examples herein are described with reference to a propulsion system, specifically of a marine vessel, it will be understood that aspect of the present disclosure, such as the transmission assemblies and components thereof described herein, may be applied to systems outside of the marine field, such as to any (e.g., industrial or manufacturing) system or process that utilizes a hybrid power plant and/or any vessel or vehicle that utilizes a hybrid propulsion system. Referring now to FIG. 1, a simplified illustration of a marine vessel 100 is shown. The marine vessel 100 has a hull 102 that defines a hull cavity. In some embodiments, the vessel 100 may include a deck 104, which may enclose at least a portion of the hull cavity and/or a superstructure 106 that may extend above the deck 104. The vessel 100 may include one or more dry areas or compartment, such as for housing cargo, personnel, or machinery of the vessel 100.

The vessel 100 includes a propulsion system 108, at least a portion of which is enclosed within the hull 102. For example, the propulsion system 108 may include a plurality of movers (e.g., a prime (or interchangeably primary) mover 110 and a second (or interchangeably secondary) mover 120) that are operatively coupled to a single output (e.g., an output flange or shaft 117) that drives a propulsor 140. The primary mover 110 and the secondary mover 120 are operatively coupled to the output via a transmission assembly 130. The transmission assembly 130 includes a transmission mechanism (or simply transmission) 114 that selectively couples, and thereby selectively transmits, the mechanical energy (e.g., torque) from either of the two input(s) (e.g., the primary and secondary movers 110 and 120, respectively) to a mechanical output (e.g., output flange or shaft 117) of the propulsion system 108. The output flange or shaft 117 may be operatively coupled to a propulsors 140 of the vessel 100, e.g., to the shaft of a propeller 116. However, as previously noted, in other examples, the output of the power plant (e.g., output flange or shaft 117) may be coupled to any other apparatus, propulsor or machine that utilizes mechanical energy (e.g., torque).

The primary mover 110 may convert a first form of energy, such as the energy stored in fuel (for example, fossil fuel such as diesel) to generate mechanical energy, e.g., in the form of rotation of the output shaft 113 of the primary mover 110. The fuel may be stored in one or more first energy storage devices 118 (e.g., one or more fuel tanks), which may be housed within the hull 102 of the vessel 100 or externally to the hull (e.g., in a sponson). In one specific example, the primary mover 110 may be a combustion engine that converts fuel into mechanical energy in the form of rotation of the output shaft of the combustion engine. Various other types of fuel-consuming engines may be used for the primary mover 110. In other examples, the primary mover 110 may be a nuclear reactor which powers a turbine, and the output shaft 113 of the primary mover 110 may be a shaft driven by the turbine. In yet other examples, the primary mover 110 may be a motor, such as an electric (e.g., AC or DC) motor.

The secondary mover 120 converts a different form of energy (e.g., stored electrical energy) into mechanical energy. For example, the secondary mover 120 may be electrically powered motor (or simply electric motor) that converts electrical energy stored in any suitable electrical energy storage (EES) device 122 (e.g., one or more batteries) into mechanical energy, e.g., in the form of a rotation of an output member (e.g., rotor 112) of the electric motor. The output member (e.g., rotor 112) of the secondary mover 120 may be operatively associated with a stationary component (e.g., a stator) of the electric motor. For example, the electric motor may be an AC motor and the rotor 112 may be rotated or driven through induction between the stator and rotor 112. In some embodiments, the electric motor may be a different type of motor (e.g., a DC motor) that may be driven responsive to rotation of the rotor 112. In some embodiments, the secondary mover 120 may be a combination motor-generator so that when the output member (e.g., rotor 112) of the secondary mover 120 is rotated or driven by an external source (e.g., by the primary mover 110), the secondary mover 120 operates in generator mode to generate electrical energy (e.g., via induction between the rotor and the stator of the motor-generator). The output member (e.g., rotor 112) of the secondary mover 120 may be co-axially arranged with the output member (e.g., output shaft 113) of the primary mover 110 for a more compact configuration.

Referring again to FIG. 1, in some embodiments, the propulsion system 108 can be positioned substantially in the aft (or stem) section 123 of the vessel 100, in proximity to the propulsor (e.g., propeller 116), such as to reduce the length of the output shaft 117. In other embodiments, one or more of the components of the propulsion system 108 (e.g., one or more of the storage devices 118 and 122, and/or one or more of the movers 110 and 120 or components thereof) may be positioned elsewhere in the vessel 100, in some cases distributed along the length of the vessel 100. In some examples, one or more of the movers 110 and 120 and/or the transmission 114 may be located sufficiently forward of the stem end of the vessel 100 to accommodate a sufficient length of shaft(s) which may split the single output of the transmission 114 to multiple driven shafts in order to power multiple individual propulsors 140 (e.g., multiple propeller 116). In other examples, individual sets of primary and secondary movers may drive individual propulsors 140 on a vessel that is driven by multiple propulsors. In further examples, one or more energy storage device may be provided amidships or in a front (or bow) section of the vessel 100. In some embodiments, the first and second energy storage devices 118 and 122 may each include multiple separate devices (e.g., multiple fuel tanks or multiple battery cells or stacks of battery cells) which may be distributed throughout the vessel 100. For example, one or more fuel tanks may be provided at various locations on the vessel 100 within the hull 102 and/or externally to the hull 102, such as in sponson or other storage containers that are located external to the hull 102. Similarly, one or more battery cells may be allocated at various locations on the vessel 100, e.g., within or externally to the hull cavity. In some embodiments, energy storage devices (e.g., one or more fuel tanks and/or one or more fuel cells/stacks) may be integrated into the hull structure. For example, one or more fuel tanks may be integrated within one or more cavities between an outer hull of the vessel 100 and an inner hull which defines interior, dry areas of the vessel 100. In some examples, EES devices (e.g., one or more battery cell or stack(s)) may be integrated between the inner and outer hulls of the vessel 100. EES devices for the systems and methods described herein may be implemented using any of the examples described in U.S. patent application Ser. No. 62/855,683, titled "Apparatuses and Methods for Marine Energy Storage," which is incorporated herein in its entirety for any purpose.

In use, the propulsion system 108 may propel the vessel 100 through water (e.g., in a forward or aft direction, depending on the rotation of the output shaft 117) through the operation (e.g., rotation) of the one or more propulsors 140 (e.g., propellers 116). Although a propeller is illustrated as an example in FIG. 1, any other suitable propulsor 140 may be used, for example, and without limitation, one or more impellers, water jets or other jet thrusters, etc. The vessel 100 is shown as a marine vessel, but it will be understood that the vessel 100 can be another type of vessel or vehicle capable of motion under power provided by its power plant (e.g., the propulsion system 108) such as a land vehicle (e.g., a truck, car, utility vehicle, Humvee, etc.) or airborne vehicle (e.g. a manned or unmanned aircraft). In some embodiments, the vessel 100 may be a high performance marine vessel (e.g., a vessel designed for operation at high-speed and/or for low observability) where any reduction in size and weight such as by reducing the size and weight of the propulsion system 108 may be advantageous to the operational capabilities of the vessel 100. In various embodiments, the primary mover 110 and secondary mover 120 may each be a combustion engine, turbine, electric motor, or similar apparatus used to generate mechanical energy (e.g., torque) that can be selectively coupled, via the transmission assembly 130, to an output (e.g., for generating propulsive force or thrust for a vehicle or vessel). In some embodiments, the primary mover 110 is a combustion engine, and the secondary mover 120 is an electric motor. In some embodiments, the primary mover 110 is a unidirectional mover, meaning that its driven shaft rotates in only one direction, and the secondary mover 120 is a bi-directional mover in that its output member (e.g., rotor 112) can be driven to rotate, and thus apply torque, in two opposite directions (e.g., clockwise and counter-clockwise).

Figure 2B:
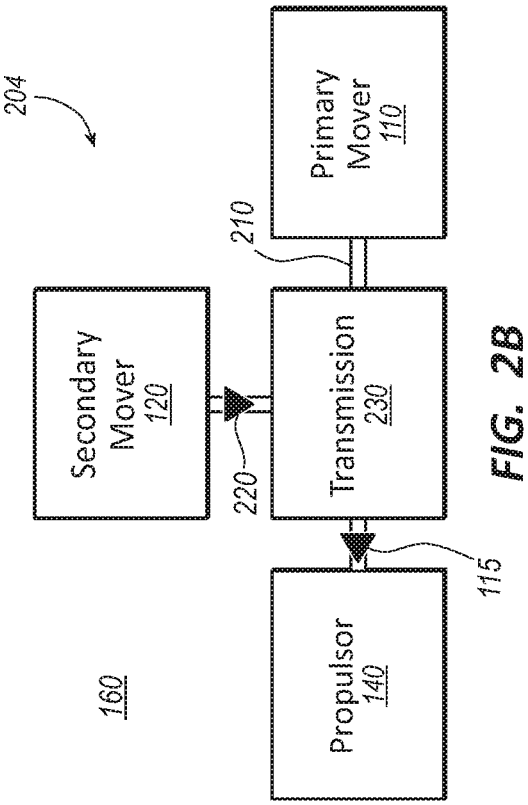
FIGS. 2A-2F are block diagrams illustrating various modes of operation of a hybrid propulsion system for a marine vessel such as the one illustrated in FIG. 1.
Figure 2D:
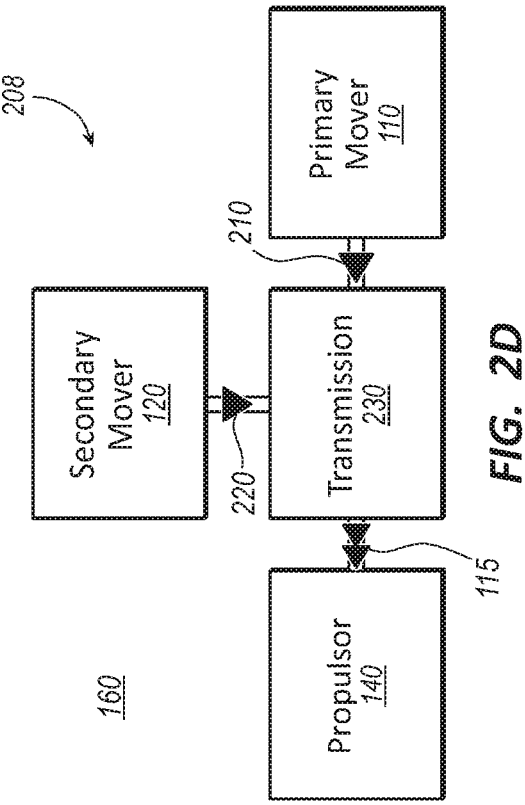

FIGS. 2A-2F show block diagrams illustrating various operational modes (e.g., modes 202, 204, 206, 208, 212, and 214) of a hybrid power plant 160, which may serve as the hybrid propulsion system of a vehicle (e.g., the propulsion system 108 of marine vessel 100 in FIG. 1). The power plant 160 includes a primary mover 110, a secondary mover 120, and a transmission assembly 230 that connects the inputs from the primary and secondary movers 110 and 120 to an output member 115 of the power plant or system 160. In the case of a marine propulsion system, the output member 115 may be coupled to propulsors 140 (e.g., propeller 116) of the marine vessel 100 or some other driven component of a vehicle or machine. Referring also to FIG. 3, which shows a simplified illustration of an example transmission assembly, the transmission assembly 230 may include a transmission mechanism (or simply transmission) 170, a shifter assembly 180, and optionally a gear assembly 190, which may provide a desired gearing ratio (e.g., a gear reduction) for varying the rotational speed and/or torque between the input(s) and the output(s) of the transmission assembly 230. The transmission assembly 230 may be used to implement the transmission assembly 130 of the propulsion system 108 of marine vessel 100.

The transmission mechanism 170 includes a clutch 172 that selectively couples a first input 210 from primary mover 110 (e.g., a rotating shaft 113 of a combustion, such as diesel or other fuel type, engine), a second input 220 from a secondary mover 120 (e.g., a rotor or torque ring of an electric motor), or both, to the output 115 of the transmission assembly 230 (e.g., output flange or shaft 117 of transmission assembly 230 in FIG. 1). The first input 210 is driven by the primary mover 110 may thus also be referred to as the primary input 210 of the transmission assembly 230, while the second input 220, which is driven, at least in some modes, by the secondary mover 120 may be referred to as the secondary input of the transmission assembly 230. The clutch 172 may selectively couple the primary input 210, the secondary input 220, and/or the output 115 to one another, such as through mechanically engagement of components, to cause the output 115 to rotate as a result of (or responsive to) power provided by the primary mover 110 and/or the secondary mover 120. The clutch 172 may be configured to seamlessly shift between a plurality of different configurations that provide different combinations of engagement between the rotating components (e.g., the inputs 210, 220 and output 115) of the transmission assembly 230 for selectively operating the power plant 160 in any one of a plurality of different modes (e.g., modes 202, 204, 206, 208, 212, and 214). The clutch 172 may be shifted between the different configurations (e.g., by physically shifting or re-positioning one or more components of the clutch 172) by a shifter rod 182. The shifter rod 182 may be part of a shifter assembly 180 that includes a controller 184, which controls the movement of the shifter rod 182. Each of the operational modes (e.g., modes 202, 204, 206, 208, 212, and 214) may be achieved by providing the transmission 170 of the power plant 160 in a corresponding transmission configuration or state as will be described further below.

Figure 2A:
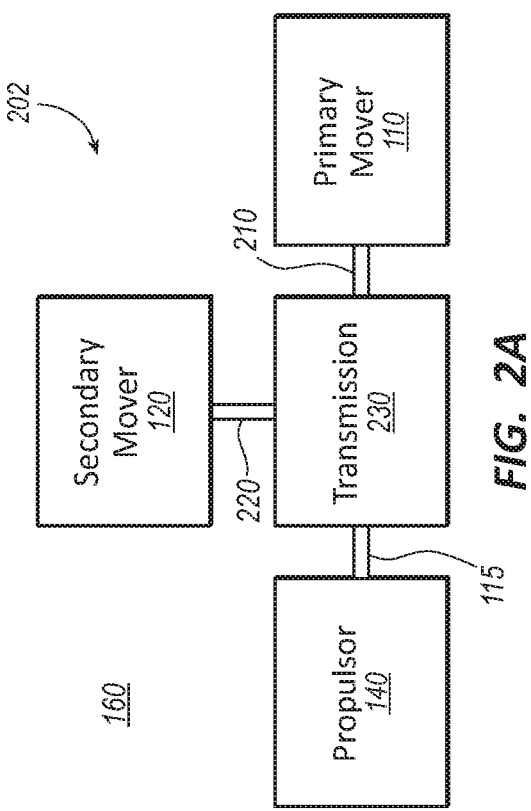
Figure 3:
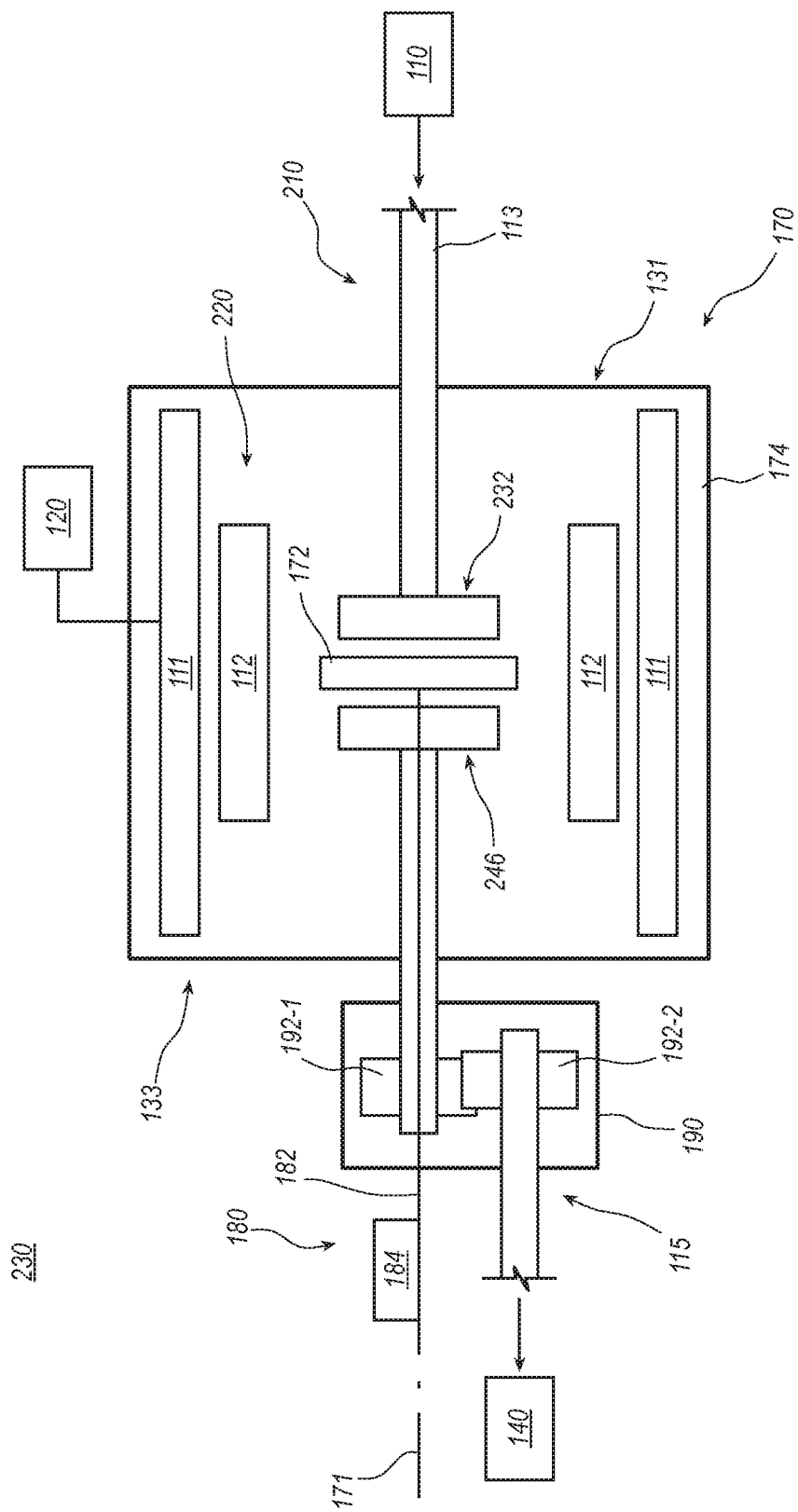
FIG. 3 is a block diagram of a transmission assembly in accordance with the present disclosure that may be used in a marine vessel such as the one illustrated in FIG. 1.

Referring to FIG. 2A, the power plant or system 160 may operate in a mode or configuration 202, referred to as neutral or disengaged mode or configuration. In mode 202, neither the primary mover 110 nor the secondary mover 120 are coupled (e.g., to provide power) to the output 115. In the marine vessel example, in the neutral mode 202, the transmission assembly 230 decouples the rotation of the primary input 210 (e.g., output shaft 113 of an engine of the vessel 100) from the output 115 such that no power is transmitted from the primary mover 110 to the output 115 even if the primary mover 110 is operational (e.g., shaft 113 continues to rotate). In the neutral configuration or mode 202, while primary input 210 rotates (under power from primary mover 110), the output 115 of the transmission assembly 230 does not rotate, providing the propulsors 140 no power. The primary mover 110 (e.g., diesel or other type of engine, or a motor) is also decoupled from the secondary mover 120 (e.g., an electrical motor/generator) such that any rotation of the primary input 210 is not transmitted to the secondary mover 120. In this mode, the secondary mover 120 may be in a passive state such that no mechanical energy is provided either by the secondary mover 120 (e.g., for rotating the output member 115) or to the secondary mover (e.g., for generating electrical energy, in cases in which the secondary mover 120 includes an electrical motor-generator).

Referring to FIGS. 2B and 3, when the power plant or system 160 is operated in a configuration or mode 204, the primary mover 110 is decoupled, via the clutch mechanism 172 of the transmission 230, from the output 115, while the secondary input 220 driven by the secondary mover 120 is coupled to, and thereby transmits torque, to the output 115 of the transmission assembly 230, to provide a power output form the power plant 160 (e.g., to a propulsor 140). This mode may be referred to as a secondary drive mode 204. In cases in which the secondary mover 120 is powered by electrical energy (e.g., an electric motor), the mode 204 may be referred to as electric drive mode 204. In such embodiments, and by virtue of being powered by an electric motor, the electric mode 204 may provide a quicker spool up or acceleration to the maximum rotational speed of the output shaft of the power plant than may be possible with a typical combustion (e.g., diesel or other fuel-type) engine. As such, the power plant 160 may be operated in this mode 204 during an engine start or initial acceleration of the engine shaft to operational RPM such that the vehicle may be driven under power and at greater speed during the engine start than would be possible if relying on the primary mover (e.g., a combustion engine). In some cases, mode 204 may provide the operational mode of maximum acceleration of a vessel 100 starting from a stationary (unpowered) condition to a moving (under power) condition, also referred to as "holeshot". Additionally or alternatively, mode 204 may be used to operate a machine (e.g., propel the vessel 100), using only the secondary type of stored energy, which may be a type that can be regenerated (e.g., electrical energy stored in a battery, which may be recharged through power generation from the secondary mover 120 and/or through harvesting such as hydro, wind, and/or solar) without having to dock the vessel. As such, fuel which may be more difficult or impossible to replenish while the vessel is under power, may be conserved while the vessel continues to operate (e.g., move) under power.

As noted above, one of the movers (e.g., the secondary mover 120) may be bi-directional in that its input/output member 220 may be rotated in two opposite (i.e., a forward and reverse) directions, while the other mover (e.g., primary mover 110) may be one-directional. As such, when the power plant 160 is configured to electric drive 204 with a bi-directional secondary mover 120, the power plant 160 may be operable in forward and reverse sub-modes in order to power the vessel in forward or in reverse. In the forward sub-mode, the secondary input 220 rotate in one direction in order to rotate the output member 115 (e.g., an output flange of the transmission and consequently shaft 117 of a propeller) in a first (forward) direction, such as to propel the vessel forward. In the reverse sub-mode, the secondary input 220 rotates in the opposite direction thereby rotating the output member 115 in the opposite direction for propelling the vessel in the reverse direction. The primary input 210 which may be coupled to a primary mover 110 that is unidirectional (e.g., non-reversible), may advantageously be decoupled during the reverse sub-mode to prevent damage to the primary mover 110. In some embodiments, reverse operation, such as reverse rotation of a shaft of the propulsor 140, such as to propel the vessel in a direction reverse to the main direction of travel, may only be achieved through power from the secondary mover 120. This may obviate the need for additional transmission components (e.g., a secondary clutch to reverse the direction of rotation from the primary mover to the output shaft), which may reduce the size, weight, and complexity of the transmission assembly for a hybrid-powered marine vessel. As such, the transmission assembly 230 can drive (or couple rotational force) to the propulsor 140 bi-directionally, without the need for a second clutch for reversing of the rotation of the output shaft, which is typically present in existing transmission assemblies for marine vessels. A transmission assembly 230 in accordance with to the present disclosure may eliminate the need for a reverse clutch and gear assembly in a marine power plant that would otherwise be required for reversing the output of a unidirectional primary mover and is thus found in conventional propulsion systems.

Figure 2C:
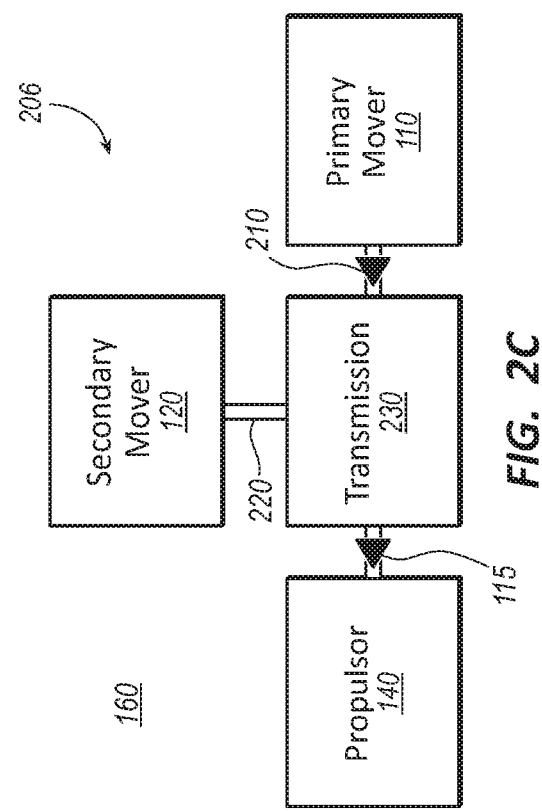

Referring to FIG. 2C, the power plant 160 may be configured to operate in another configuration or mode 206 in which the primary input 210, and thus the primary mover 110, drives the output 115 of the transmission assembly (e.g., to drive a propulsors 140), without input from the secondary mover 120. In mode 206, the rotation of primary input 210 is decoupled from the secondary mover 120 such that the primary mover 110 is operated independently from (e.g., without any assistance from or energy being diverted to) the secondary mover 120. As such, mode 206 may also be referred to as primary drive mode. In some embodiments, the primary mover 110 may have different performance characteristics, for example by being more efficient at propelling the vessel (e.g., based on a rate of consumption of energy (e.g., fuel), the cost of that energy, and the output provided from the conversion of that energy into motive force (e.g., thrust)). Thus, it may be advantageous in some embodiments to be able to provide power only from the primary mover 110, while conserving the secondary power source (e.g., electrical power). In other instances, the configuration or mode 206 may be used when a slower acceleration profile of the primary mover 110 (e.g., a diesel or other type of engine) may be beneficial for a particular operational scenario of the vessel 100, such as when it may be useful to minimize the size and visibility of its wake or to increase vessel range.

Referring to FIG. 2D, the power plant 160 may be operated in mode 208, in which both the primary and secondary inputs 210 and 220, respectively, and consequently both the primary and secondary movers 110 and 120, are coupled to the output 115. In some such cases, one of the movers (e.g., the secondary mover 120) can be said to supplement or boost the output of the other mover (e.g., the primary mover), and this configuration or mode 208 may thus also be referred to as boost configuration or mode. Mode 208 may be used to reach and/or temporarily operate at higher acceleration or velocity than the typical/design parameters for the vessel 100. Mode 208 may facilitate more efficient fuel and/or energy consumption of the power plant 160, such as by allowing operation of one of the movers at a desired (e.g., a design optimal RPM) while supplementing the power output of the power plant with power from the other one of the movers.

Figure 2F:
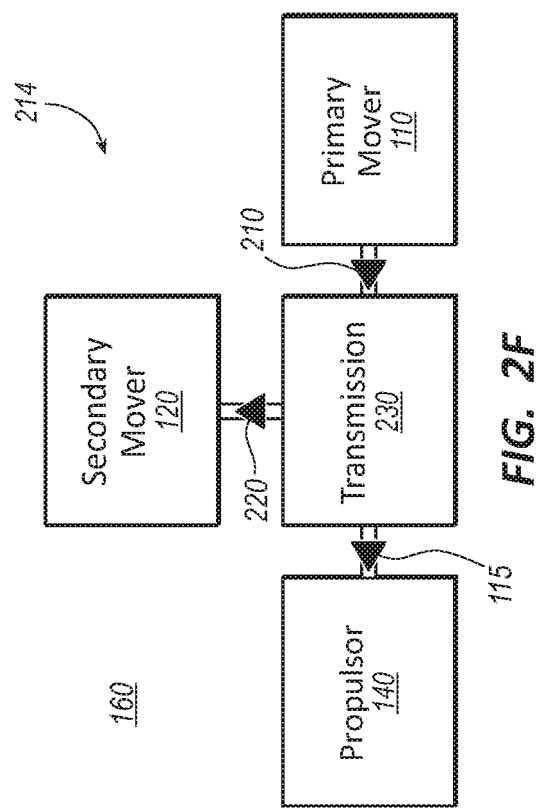
Figure 2E:
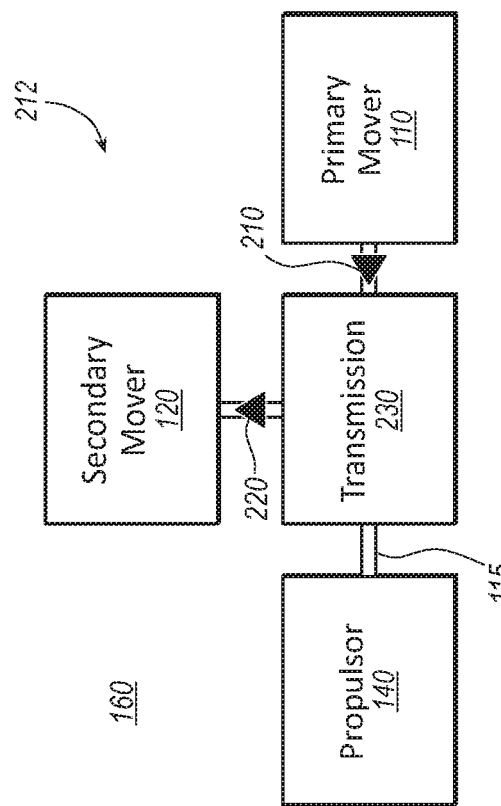

In yet another configuration or mode 212, as illustrated in FIG. 2E, the primary input 210 which is driven by primary mover 110 is decoupled from the output 115 of the transmission assembly, whereby, in the case of a propulsion system, no propulsive force is provided by the primary mover 110 and the vessel/vehicle is said to be in neutral. However, unlike in the neutral mode, the output of the primary mover 110 (e.g., first input 210) may be coupled to and provided as an input to the secondary mover 120. This configuration can be beneficial in embodiments where the secondary mover 120 includes an electric motor-generator, which may generate electrical energy responsive to the mechanical force (e.g., rotation) of the primary mover 110. The generated electrical energy may be stored by any suitable energy storage device on the vessel (e.g., ESS device 122), and the mode 212 may, thus, also be referred to as electrical energy (EE) generation mode. Often, such as when using large combustion (e.g., diesel) engine(s) to power a vessel or other machinery, a shut-down of the engine, whenever desired to temporarily arrest the vessel or machinery, may be impractical and thus the engine may be decoupled from the output of the transmission (e.g., from the propulsors 140). Mode 212 may thus reduce the waste of fuel, which continues to be consumed during times when the engine idles and the gear engaged or is in neutral and not engaged to the propulsor, by recapturing some of the mechanical energy of the primary mover 110 as electrical energy that can be stored for later usage.

Referring now to FIG. 2F, in a further configuration or mode 214, the output of the primary mover 110 (e.g., primary input 210) is coupled, e.g., via the transmission assembly 130, to both the output member 115, such as to drive rotation of the output member 115, and is also provided to the secondary mover 120 such as to enable the generation of electrical energy by the secondary mover 120, in embodiments in which the secondary mover 120 is capable of generating energy (e.g., an electric generator). In such embodiments, the gearbox may be a multi-speed gearbox, for example a gearbox capable of operating at least at two speeds, at predetermined RPM ranges. In the example of a vessel 100, the vessel can move (under the power provided by the primary mover 110, e.g., under diesel or other fuel source), while also generating electrical energy (e.g., for use by or storage on the vessel). This mode may be used, for example, to both provide propulsive force, using a fuel-powered primary mover 110, and simultaneously generate electricity, such as for immediate consumption by the vessel (e.g., when no stored electrical energy is not available) and/or for storage for later consumption. This mode may be used in scenarios where it may be beneficial to operate the power plant at a given power output (e.g., for efficiency) but not all of the power output is utilized to power the driven machine (e.g., to propel the vessel 100), in which case instead of operating the power plant at a less efficient power output, unused power may be used to generate electrical energy for concurrent use or storage.

A transmission according to the present disclosure (e.g., transmission assembly 130) may be configured to change between any of the operating modes (e.g., 202, 204, 206, 208, 212, and 214) quickly and seamlessly while the primary and/or secondary movers 110, 120 are operating at speed. For example, the transmission assembly 130 may be operated to engage or disengage the clutch mechanism 172 for coupling and decoupling of the primary mover 110 and/or the secondary mover 120 to one another and/or to the output 115 of the power plant 160.

With continued reference to FIG. 3, a transmission assembly 130 according to some examples of the present disclosure may include a transmission mechanism 170 (also referred to as transmission box 170), a shifter assembly 180, and optionally a gear assembly 190 (also referred to as gearbox 190) for gearing (e.g., up or down) the rotational speed and/or torque between the input(s) and the output of the transmission assembly 130. Components of the transmission mechanism 170 are enclosed in a transmission housing 174. In some embodiments, the transmission mechanism 170 while capable of receiving inputs from two different movers may include only a single input shaft extending from the transmission housing 174, providing a more compact form factor. For example, the transmission mechanism may include a first rotor 232 which has a shaft that extends from the input side or end 131 of the transmission housing 174. The primary mover 110 may be coupled to the first rotor 232 (e.g., via a fitting connecting the shafts of the rotor 232 and the primary mover 110) to rotate the first rotor 232 in synchrony with the rotation of the output shaft of the primary mover 110. The first rotor 232 rotates responsive to the primary mover 110 about a rotational axis 171, which may be the same as the axis of the output shaft of the primary mover 110. As such, the first rotor 232 may be used to implement the first input 210 of the power plant 160 in FIGS. 2A-2F.

A second rotor 112, which is driven by the secondary mover 120 and thus provides the secondary input 220, may be positioned co-axially with the first rotor 232. As such, the second rotor 112 may rotate about the same rotation axis 171 of the first rotor 232. The second rotor 112 may be implemented, in part, by a torque ring which is operatively positioned in relation to a stator 111 of an electric motor (or motor-generator) that acts as the secondary mover 120. The stator 111 may be fixed relative to the transmission housing 174 (e.g., inside the housing 174) with the rotor 112 (e.g., a torque ring) positioned within the magnetic field of the stator 111 for generating torque, such as through electromagnetic induction. The secondary mover 120 may rotate the rotor 112 through electromagnetic force (e.g., induction). The rotor 112 and in some cases the stator 111 may be integrated within the transmission housing 174, thereby integrating, at least the rotating component of the motor-generator, into the transmission box 174 to provide a more compact design.

An output rotor 246 is positioned opposite to and co-axially with the input rotor 232 such that the output rotor 246 rotates about a common rotational axis 171 with the first rotor 232. The output rotor 246 is located near the output side or end 133 of the transmission housing 174 and has an end portion (e.g., a shaft) that extends from the output side 133 of the transmission housing 174. The rotational axis 171 may be said to define the axial direction of the transmission box 170, with the input and output sides 131 and 133, respectively, of the transmission housing 174 located at the opposite axial ends thereof. The output rotor 246 may be configured to selectively engage (e.g., via clutch 172) the first rotor 232 and/or the second rotor 112 such that the output rotor 246 selectively rotates responsive to input from either the primary mover 110 and/or the secondary mover 120. In some embodiments, in which the secondary mover 120 is bi-directional, the second rotor 212 may selectively rotate the output rotor 246 in a first (e.g., forward) direction and in a second (e.g., reverse) directions whereby forward and reverse rotation of a driven shaft (e.g., the output 115) may be provided responsive to input from the secondary mover 120, independent of the primary mover 110.

A clutch mechanism (or simply clutch) 172 is provided between the first and second rotors 232 and 112, respectively and the output rotor 246 for selectively coupling the first rotor 232 to the second rotor 112 and/or the output rotor 246, or the second rotor to the output rotor 246 independent of the first rotor 232. The clutch 172 may be re-configured between a plurality of different configurations or states for selectively coupling (e.g., mechanically engaging) the first rotor 232 to the output rotor 246, to the second rotor 112 or both, or for selectively coupling (e.g., mechanically engaging) the second rotor 112 to the output rotor 246 independent of the first rotor 232. A shifter assembly (or simply shifter) 180, at least a portion of which is received within the transmission box 170 (e.g., within the housing 174) is operatively associated with the clutch 172 to re-configure (e.g., by moving one or more components of) the clutch 172 between its multiple configurations or states. For example, the shifter assembly 180 may include a shifter rod 182 connected to the clutch 172 to shift the clutch 172 between a configuration in which the output rotor 246 is coupled, and thus rotates responsive, to the first rotor 232 and a second configuration in which the output rotor 246 is decoupled from the first rotor 232 but is coupled, and thus rotates responsive, to the second rotor 112. The shifter rod 182 may extend along the axial direction (e.g., axis 171), in some embodiments, passing through the center of the output rotor 246. The shifter rod 182 may move along the axial direction (e.g., along axis 171) to shift the clutch 172 between its various configurations or states such as to reconfigure the transmission into any of its plurality of configurations or operational modes (e.g. modes 202, 204, 206, 208, 212, and 214). In some embodiments, the shifter rod 182 may move, such as to shift the clutch 172, responsive to control from an electronic controller 184 or responsive to manual control (e.g., an emergency override). The clutch 172 may include one or more components that move axially relative to first and second rotors 232 and 112, respectively, and relative to the output rotor 246, which remain generally in a fixed axial position (e.g., axially fixed relative to one another and the transmission housing 174. In some embodiments, the clutch 172 may be implemented as a dual-clutch assembly that includes components associated with the inputs side of the transmission assembly and components associated with the output side of the transmission assembly.

The output 115 of the transmission assembly 230 may extend form an output end of the transmission housing 174. The output 115 may be configured for coupling, such as via another fitting, to a propulsor (e.g., to the rotatably driven shaft of a propeller) or some other driven machine. In some embodiments, the output 115 of the transmission may be redirected, such as via a gear assembly 190, along a direction different than the axial direction 171. For example, a plurality of gears (e.g., gears 192-1 and 192-2) may be used to transmit the rotation of the shafts of the rotors to a shaft that is offset from the co-axially aligned shafts of the rotors 232 and 246. In some examples, the one or more gears 192 may additionally or alternatively alter the power output such as by applying a gearing ratio (e.g., to gear down or up) the rotation of the transmission members (e.g., rotors 232 and 246). The input and output members may be any suitable rotating components that can transmit rotational force (e.g., torque) received as input to the transmission 130 to a rotational force (e.g., torque) provided as output of the transmission 130, which may then be coupled to another component or machine (e.g., a propulsors) to provide a desired function (e.g., generate propulsive force for a waterborne vessel).

FIGS. 4A-22 show views of an example transmission 300 and components thereof in accordance with some embodiments of the present disclosure. The transmission 300 can be used to implement the transmissions 114 in FIG. 1 or the transmission 230 in FIGS. 2A-2F and FIG. 3. As such, in some embodiments, the transmission 300 can be used to selectively couple primary and secondary movers of a hybrid propulsion system of a watercraft, such as vessel 100, to one or more propulsors of the watercraft. A transmission according to the present disclosure may enable shifting between a plurality of operational modes, e.g., modes 202, 204, 206, 208, 212, and 212 described above with respect to FIGS. 2A-2F, while being relatively compact and lightweight compared to existing marine transmission assemblies.

Figure 4A:
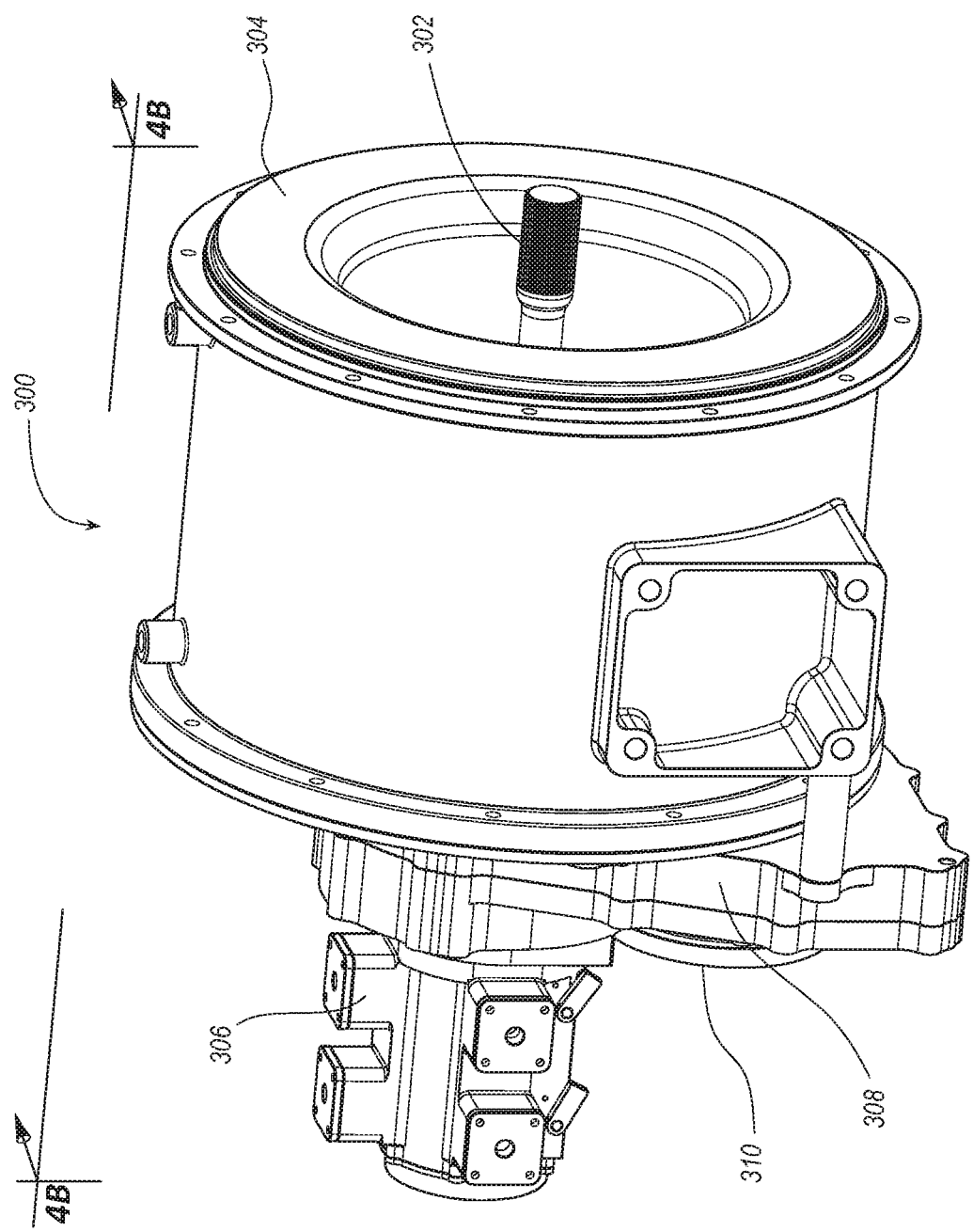
FIG. 4A is a perspective view of a transmission assembly in accordance with the present disclosure.
Figure 4B:
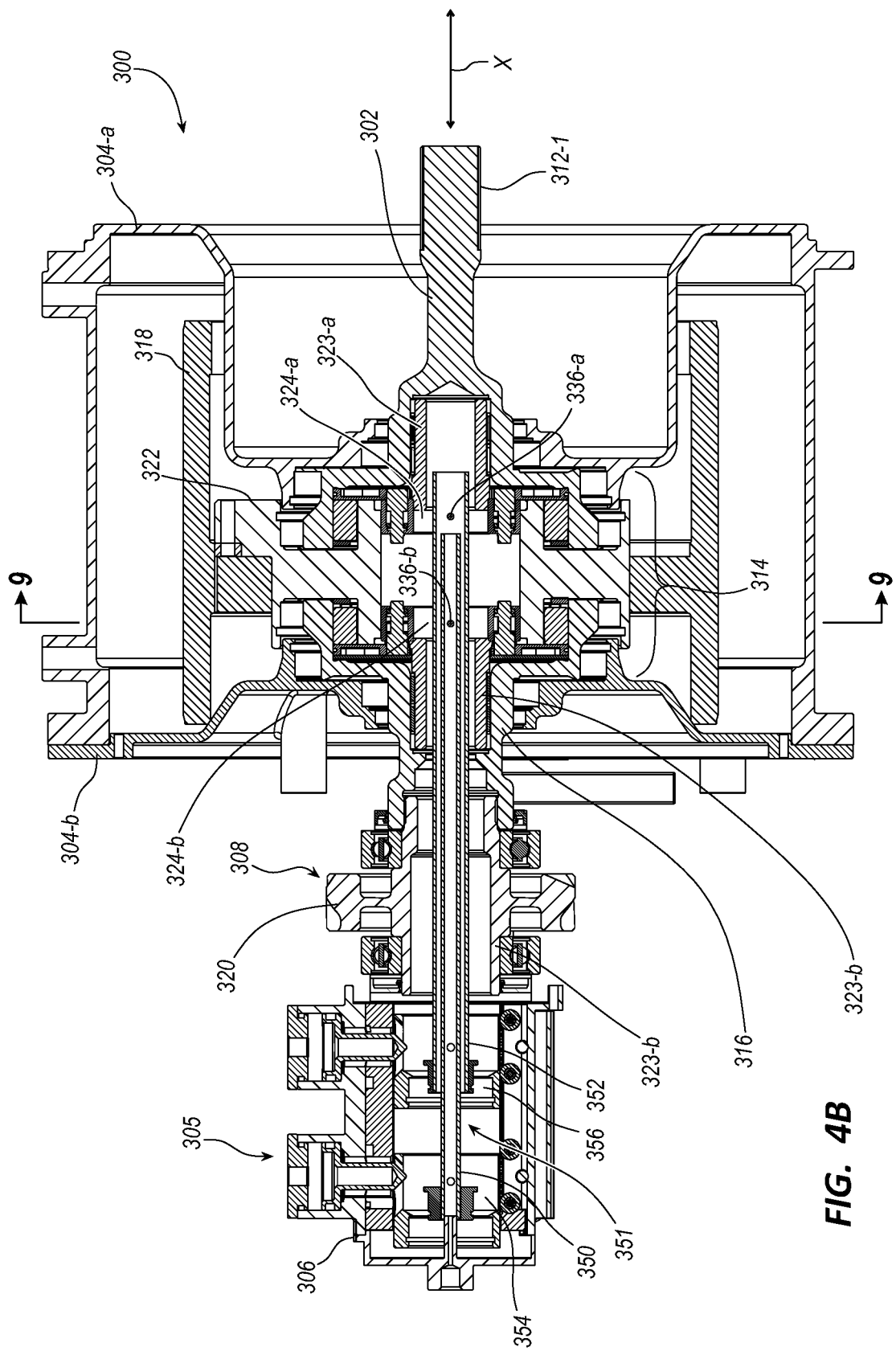
FIG. 4B is a section view of the transmission assembly of FIG. 3 taken at section line 4B-4B in FIG. 4A.

Referring to FIGS. 4A and 4B, in some embodiments, the transmission 300 includes an input rotor 302, an output rotor 316, and a clutch assembly (or simply clutch) 314, which may be provided within in a transmission housing 304, also referred to as main housing 304. The main housing 304 may be formed of two or more separably formed portions. For example, the main housing 304 may be formed by joining a first housing portion 304a, which may provide the input side of the transmission box, and a second housing portion 304b, which may provide the output side of the transmission box. Any other suitable combination (e.g., left and right halves that meet along a radial plane) or number of housing portions may be used to accommodate assembly of the internal components of the transmission box. A first (e.g., input) end 312-1 of the input rotor 302, shown here as a shaft, may extend from a first (e.g., the input) side of the transmission 300 for connecting the input rotor 302 to a mover (e.g., a primary mover such as a combustion engine). For example, the first end 312-1 of the input rotor 302 may engage a fitting of a drive shaft of a prime mover (e.g., primary mover 110) such that the input rotor 302 is driven by the prime mover. A second (e.g., output) end 312-2 of the input rotor 302 is located inside the transmission housing 304 facing the output rotor 316. The input and output rotors 302 and 304 are co-axially arranged and rotated about common rotational axis X. The second end 312-2 of the input rotor 302 is spaced apart from the first end 317-1 of the output rotor 316 to accommodate the clutch 314 therebetween. In some embodiments, the input rotor 302 and/or the output rotor 316 may define a respective cavity configured to accommodate at least a portion of the clutch 314 therein. The clutch 314 is configured to selectively engage or couple the input and output rotors 302 and 316, respectively, e.g., for selectively coupling mechanical force (e.g., torque) provided via the input rotor 302 to the output end of the transmission 300.

Figure 5:
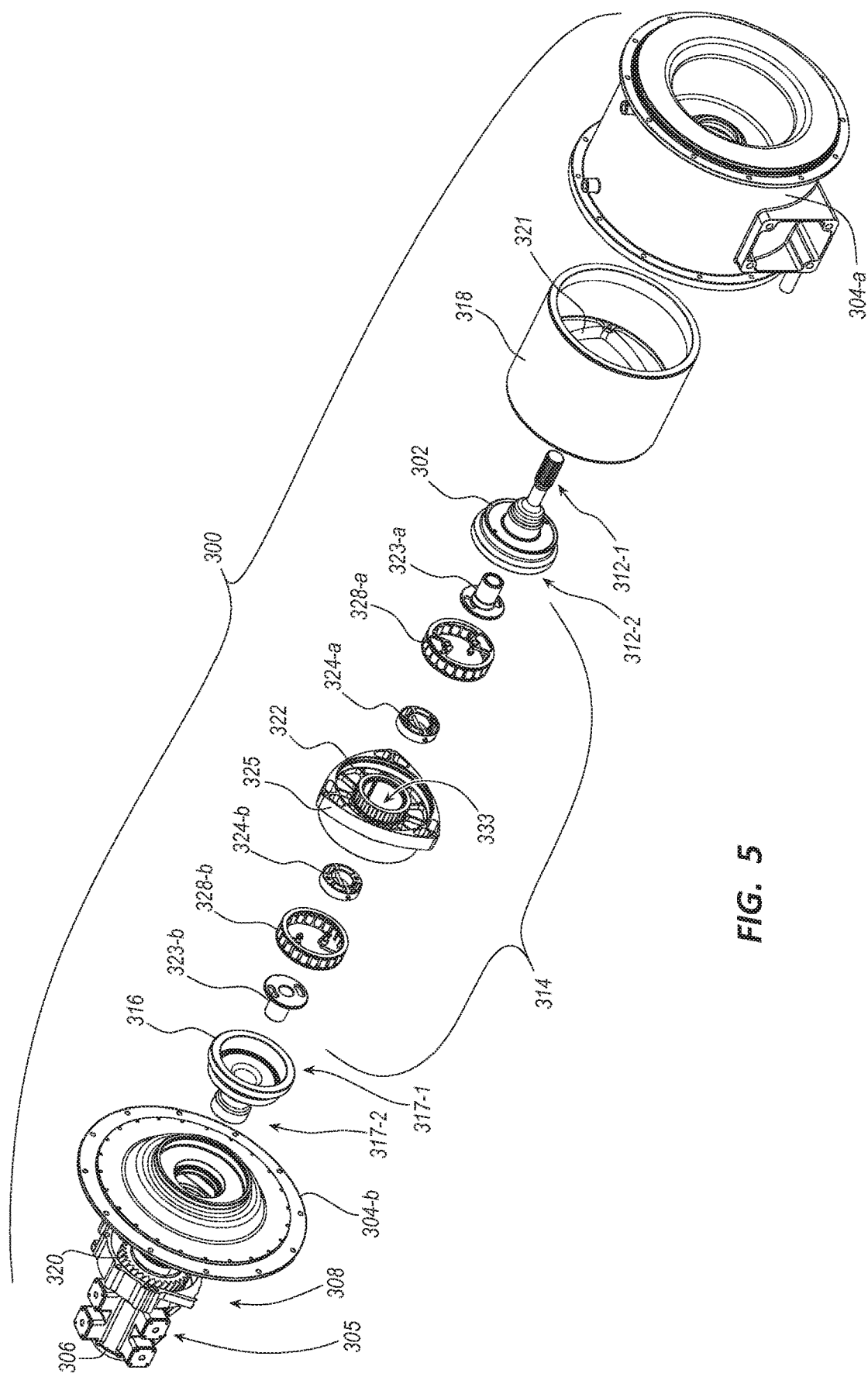
FIG. 5 is an exploded view of the transmission assembly of FIG. 4A.

The second end 317-2 (e.g., a shaft) of the output rotor 316 may extend from the output side of the transmission and may connect, either directly or via gearbox 308 to the shaft of a driven machine (e.g., the shaft of a propulsors 140). The gearbox 308 may transmit the power (e.g., torque) of the output rotor 316 without altering the power output and may merely function to re-locate, such as offset the axis of, the power supplied. In other embodiments, the gearbox 308 may alter the torque output (e.g., gear down or gear up the output provided at output member 310). For example, the gearbox 308 may include two or more gears 320 that operatively engage to transmit and/or provide a desired gear ratio between the output end 317-2 (e.g., the shaft) of the output rotor 316 and the output member (e.g., shaft or flange) 310 of the transmission assembly 300. In some embodiments, the gearbox 308 may be a single speed gear box in that the gear ratio provided by the gear box 308 is fixed. In other examples, the gearbox 308 may be a multi-speed gearbox (e.g., a two-speed gear box or other), such as to provide a selectively adjustable gear ratio. The transmission 300 may include a shifter assembly 305, which may be enclosed in the main housing 304 or in a separate shifter housing 306, shown, in this example, as located proximate to the output side of the transmission. In other embodiments, the shifter assembly 305 may be located elsewhere, such as near the input side of the transmission or at a location about the periphery of the main housing 304. In some embodiments, the shifter housing 306 may be spaced apart from the main housing 304 to accommodate at least a portion of the gear assembly (or gearbox) 308 therebetween. In FIGS. 4B and 5, a portion of the gearbox 308, as well as the output member 310, have been omitted so as not to obfuscate other elements of the transmission assembly 300.

The clutch assembly 314 also engages a torque ring 318, which functions as the secondary input (e.g., secondary rotor 112) associated with secondary mover 120. For example, the torque ring 318 may be configured to rotate relative to a stator of an electric motor (or motor-generator, in embodiments in which the power plant is operable to also generate electricity). The torque ring 318 may be arranged to extend radially from and at least partially surround the clutch 314. The torque ring 318 may be arranged co-axially relative to the input and output rotors 302 and 316, respectively, and in some cases relative to one or more components of the clutch 314 such that the torque ring 318 rotates about a common rotational axis therewith. The stator of an electric motor may, at least partially, radially surround the torque ring 318 and may comprise a coil or winding configured to electromagnetically interact with the torque ring 318 for either causing the torque ring to rotate or extracting energy from the rotation or the torque ring 318. The torque ring 318 may comprise a ferromagnetic or electromagnetic portion that interacts with a magnetic field generated by the stator.

In some embodiments the rotor of the secondary mover (e.g., torque ring 318) may be configured to rotate in synchrony with one or more components of the clutch assembly 314 (e.g., clutch body 322). For example, the rotor of the secondary mover (e.g., torque ring 318) may be rigidly coupled to one or more components of the clutch assembly 314 (e.g., the clutch body 322) such that rotation of either one of the rotor of the secondary mover (e.g., torque ring 318) or the component of the clutch assembly 314 (e.g., clutch body 322) causes the other one of the rotor of the secondary mover (e.g., torque ring 318) or the component of the clutch assembly 314 (e.g., clutch body 322) to rotate. The clutch body 322 may be fixedly coupled to the torque ring 318 via any suitable method, such as by welding or fastening the clutch body 322 thereto. In some embodiments, the clutch body 322 may include a radial bearing surface 325 which fits into and bears against a radial recessed surface 321 of the clutch body 322. The bearing surface 325 and the recessed surface 321 may have corresponding shapes and, in some embodiments, may be substantially co-extensive with one another. The bearing surface 325 and the recessed surface 321 may be configured to position the clutch body 322 non-rotatably with respect to the torque ring 318, irrespective of any additional fastening means (e.g., welding or bolting the two components together). For example, the cam surface 325 and the recessed surface 321 may have a generally triangular (e.g., rounded triangular) shape as shown in the example in FIGS. 5-7. In other embodiments, the two surfaces may be differently non-rotatably coupled, such as by being keyed to one another or by using a different non-circular shape (e.g., rectangular or other) for the two mating surfaces. The bearing surface 325 may bear (or apply a force) against the recessed surface 321 when the clutch body 322 transmits torque to the torque ring 318 and vice versa, the recessed surface 321 may bear against the bearing surface 325 then the torque ring 318 transmits torque to the clutch body 322. Using corresponding non-rotatably engaging surfaces (e.g., bearing surface 325 and recessed surface 321) may allow for more efficient transfer of torque between components (e.g., between the torque ring 318 and the clutch body 322), reducing or substantially eliminating the bearing loads on any fasteners, if used, for coupling the two components, while still allowing the two components (e.g., the torque ring 318 and the clutch body 322) to be removably/reversibly coupled, for example for maintenance and/or replacement of parts. The clutch body 322 and the torque ring 318 may additionally or alternatively be coupled to one another using fasteners, adhesives, welding, other attachment methods known in the art, and combinations thereof.

Figure 6:
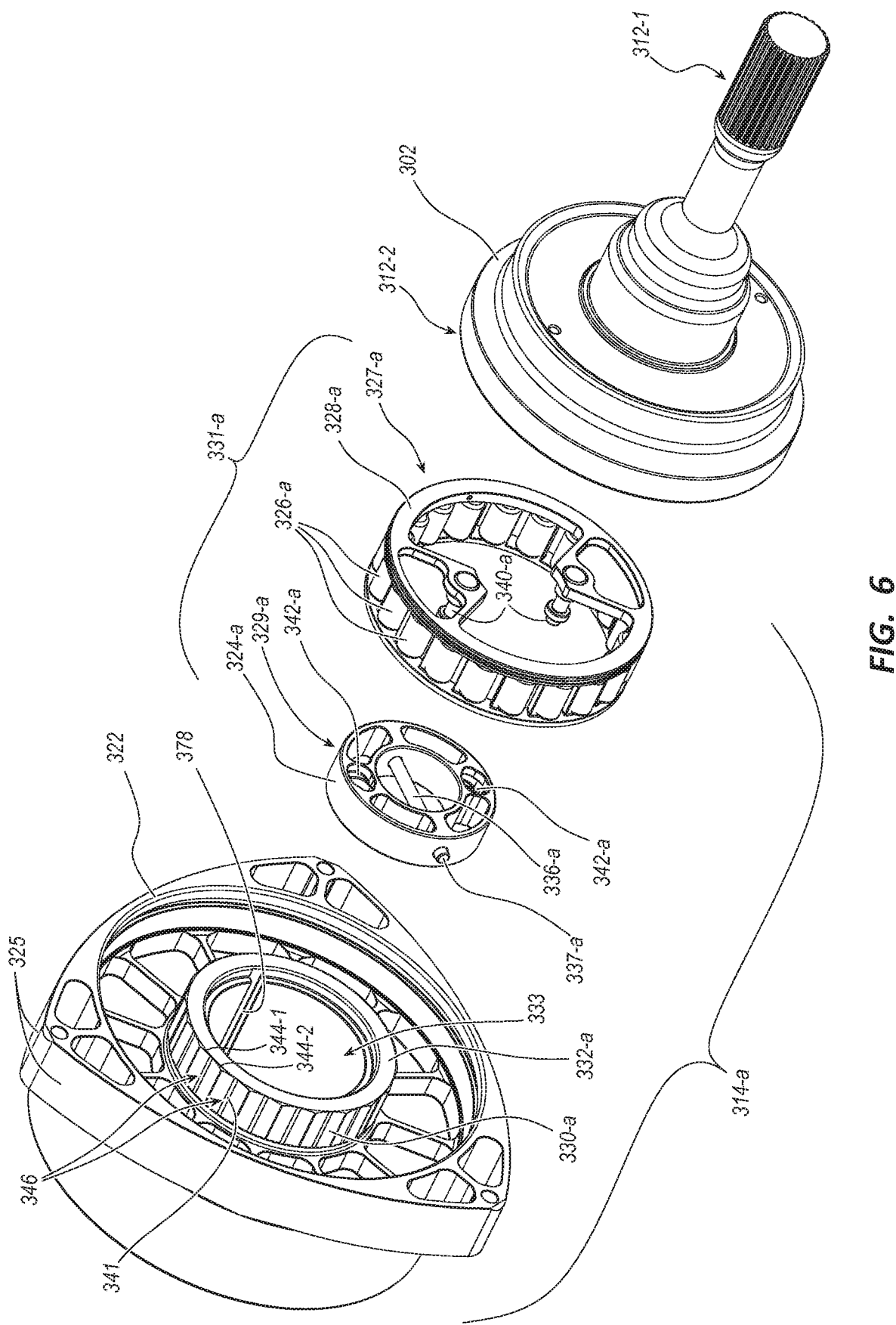
FIG. 6 is an enlarged view of a portion of the exploded view of the transmission assembly in FIG. 5.
Figure 7:
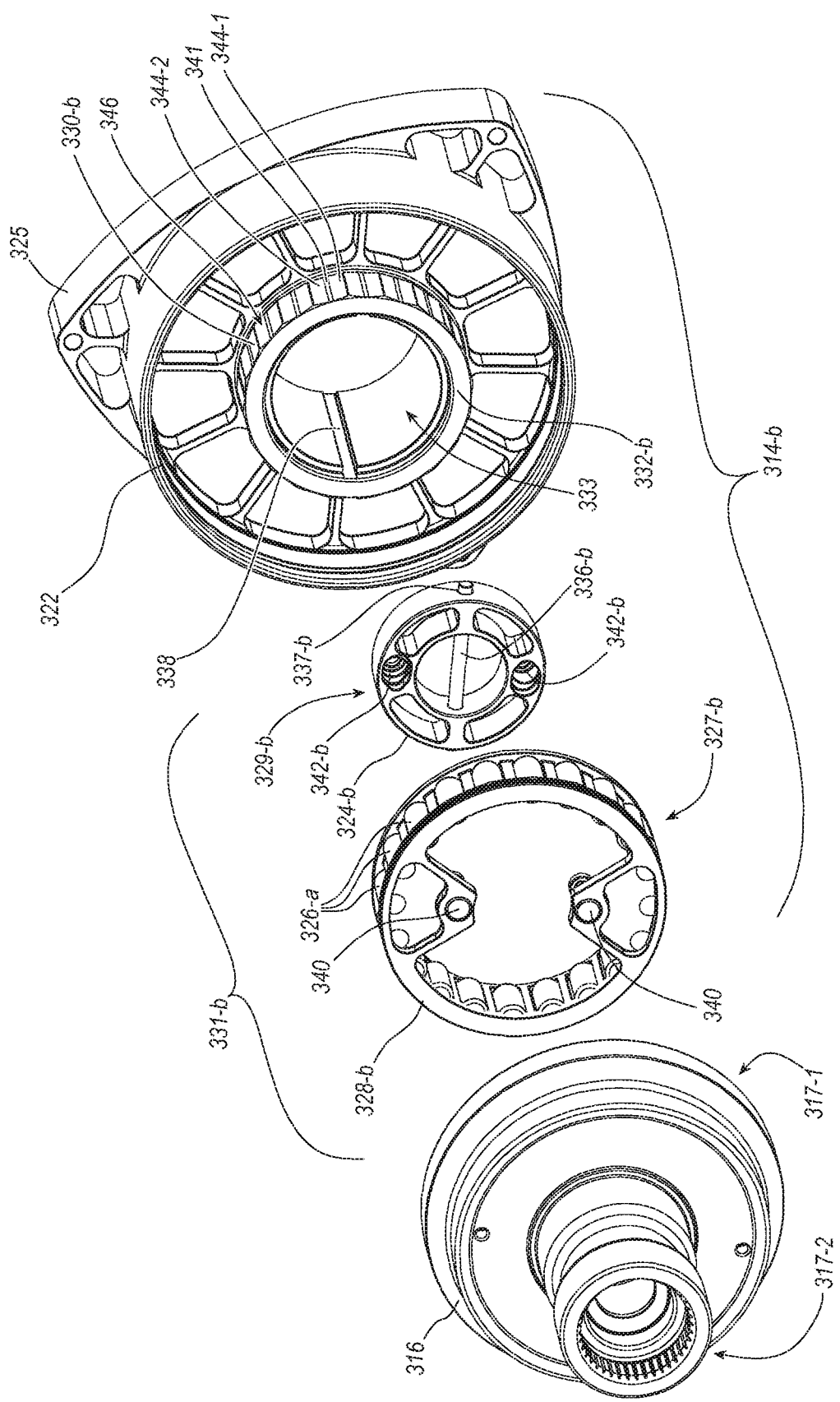
FIG. 7 is an enlarged partial exploded view of the transmission assembly in FIG. 5 viewed from the output side toward the input side.
Figure 8:
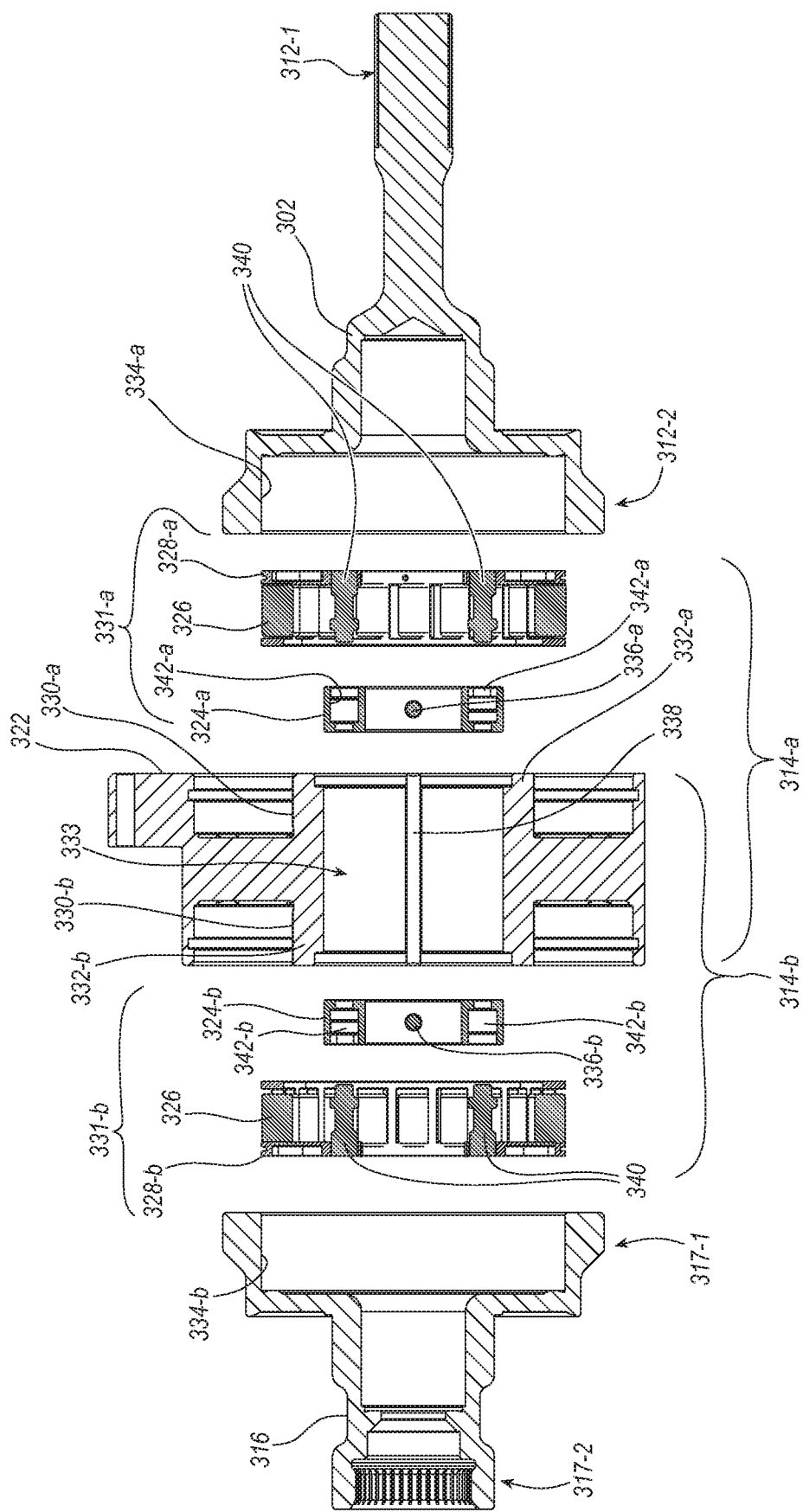
FIG. 8 is an exploded section view of the clutch assembly of FIG. 4B.

The clutch 314 has an input side or portion 314-*a* and an output side or portion 314-*b* arranged on opposite sides of the clutch body 322. Referring further to FIG. 6, the input side 314-*a* controls the transmission of torque from the input rotor 302 to the clutch body 322. The output side 314-*b* controls the transmission of torque from the clutch body 322 to the output rotor 316, e.g., as can be seen in FIG. 7. Referring to FIGS. 6 and 7, and also to the cross-sectional exploded view in FIG. 8, the components and operation of the clutch 314 will be further described.

The clutch body 322 may include a rotor alignment feature, which may be implemented by a pair of tubular portions extending in axially opposite directions from the clutch body 322. A first tubular portion 332-*a* extends from the input side of the clutch body 322 axially towards the input rotor 302 and is configured to be received within a cavity on the second side 312-2 of the input rotor 302. A second tubular portion 332-*b* extends from the output side of the clutch body 322 axially towards the output rotor 316 and is configured to be received in a cavity on the first side 317-1 of the output rotor 316. The first tubular portion 332-*a* and the second tubular portion 332-*b* may, but need not, have the same geometry (e.g., a same diameter). The first tubular portion 332-*a* and the second tubular portion 332-*b* are axially aligned (along axis X) and may thus facilitate axial alignment of the spaced-apart input and output rotors 302 and 316, respectively. The clutch body 322 defines a central passage 333, which may facilitate the positioning of a shifter (e.g., shifter assembly 305 on one side of the clutch body 322 while enabling the connection of the shifter member (e.g., shifter rod 351) to both of the two opposite sides of the clutch body 322, such for operating the input and output sides of the clutch 314. The central passage 333 may be a through passage that extends axially, through the first tubular portion 332-*a* and the second tubular portion 332-*b*, connecting the input side to the output side of the clutch body 322.

The input side 314-*a* includes a first (or input-side) clutch engagement member 327-*a*, shown here as a first plurality of input rollers 326-*a* operatively associated with an input roller cage 328-*a*, provided on the input side of the clutch body 322. The clutch engagement member 327-*a* is operatively associated with a first (or input-side) clutch shifting member 329-*a*, shown here as an input shift ring 324-*a*. The clutch engagement member 327-*a* and the clutch shifting member 329-*a* may be collectively referred to as an input selector or input shifter 331-*a* of the transmission 300. The output side 314-*b* includes a second (or output-side) clutch engagement member 327-*b*, shown here as a second plurality of input rollers 326-*b* operatively associated with an output roller cage 328-*b*. The clutch engagement member 327-*b* is operatively associated with a second (or output-side) clutch shifting member 329-*b*, shown here as an output shift ring 324-*b*. The clutch engagement member 327-*b* and the clutch shifting member 329-*b* may be collectively referred to as an output selector or output shifter 331-*b* of the transmission 300.

The clutch body 322 includes a first (or input) cam surface 330-*a* and a second (or output) cam surface 330-*b* positioned on respective one of the input and output sides of the clutch body 322. The first (or input) cam surface 330-*a* is configured to selectively engage an engagement surface (e.g., drum surface 334-*a*) of the input rotor 302 and the second (or output) cam surface 330-*b* is configured to selectively engage an engagement surface (e.g., drum surface 334-*b*) of the output rotor 302 such that rotation of the input rotor 302 may be coupled, in some modes, to the clutch body 322 thereby coupling the rotation of the input rotor 302 to the torque ring 318, and in some modes further couple the rotation of the input rotor 302 to the output rotor 316 via the output side of the clutch body 322. In the present example, the first cam surface 330-*a* is provided on the radially-outward-facing surface of the first tubular portion 332-*a* and the second cam surface 330-*b* is provided on the radially-outward-facing surface of the second tubular portion 332-*b*. A first drum surface 334-*a* is provided on the radially-inward-facing surface of the cavity of the input rotor 302, which receives the first tubular portion 332-*a* and a second drum surface 334-*b* is provided on the radially-inward-facing surface of the cavity of the output rotor 316, which receives the second tubular portion 332-*b*. When assembled, the two radially-outward-facing surfaces (e.g., first and second cam surfaces 332-*a* and 332-*b*) are arranged to face the radially-inward-facing surfaces (e.g., drum surfaces 334-*a* and 334-*b*) of the respective one of the input rotor 302 or the output rotor 316 for selectively engaging, via the respective clutch engagement member 327-*a* or 327-*b*, the engagement surface of the input rotor 302 or the output rotor 316. The drum surfaces 334-*a* and 334-*b* may be radially spaced from the respective cam surface 330-*a* and 330-*b* to accommodate the respective clutch engagement member 327-*a* or 327-*b* there between. As such, when assembled, the first set of rollers 326-*a* and associated roller cage 328-*a* are positioned or captured between the first cam surface 330-*a* and the drum surface 334-*a* of the input rotor, while the second set of rollers 326-*b* and associated roller cage 328-*b* are positioned or captured between the second cam surface 330-*a* and the drum surface 334-*b* of the output rotor 316.

The central passage 333 of the clutch body 322 may be sized to accommodate the first and second shift rings 324-*a* and 324-*b* at least partially therein, as well as the shifter rod 351 enabling the shifter rod 351 to pass through the clutch body 322 to be connected to each of the opposing shift rings 324-*a* and 324-*b*. The shifter rod 351 may be operatively coupled to each of the input and output selectors, and more specifically to the clutch shifting member 329-*a* and 329-*b* on each of the input and output sides of the clutch to axially move the clutch shifting member 329-*a* and 329-*b*, in some cases independently of one another to effect the shifting or reconfiguring of the clutch between the plurality of different clutch configurations or states. As shown in FIG. 4B, the shifter rod 351 may be implemented, in some embodiments, using a pair of rods (e.g., first rod 352 and second rod 350). The first rod 352 may be coupled to the input selector (e.g., to the input shift ring 324-*a*) and the second rod 350 may be coupled to the output selector (e.g., to the output shift ring 324-*b*). The first and second rods 352 and 350, respectively, may be axially aligned and one of the rods (e.g., the first rod 352) may be inserted and pass through at least a portion of the length of the second rod 350. As such, the first rod 352 may also be referred to as inner rod 352 and the second rod 350 may be referred to as outer rod 350. The first rod 352 may be non-rotatably connected to the input shift ring 324-*a* such that axial movement (along direction X) of the first rod 352 causes corresponding axial movement (along direction X) of the input shift ring 324-*a*. By being non-rotatably coupled to the shift ring 324-*a*, for example via a transverse shaft 336-*a*, the first rod 352 may rotate relative to (e.g., within) the second rod 350, in synchrony with the rotation of the shift ring 324-*a*. Similarly, the second rod 350 may be non-rotatably connected to the output shift ring 324-*b* such that axial movement (along direction X) of the second rod 350 causes corresponding axial movement (along direction X) of the output shift ring 324-*b*. By non-rotatably coupling the shift ring 324-*b*, for example via a transverse shaft 336-*b*, to the second rod 350, the second rod 350 may rotate relative to the first rod 352, in synchrony with rotation of the shift ring 324-*b*. Each of the first and second rods 352 and 350, respectively, may move axially and/or rotate independently of one another.

The first and second shift rings 324-*a* and 324-*b* may be non-rotatably received within the central passage 333. For example, each of the first and second shift rings 324-*a* and 324-*b* may be keyed to the central passage for example via respective one or more radial pins (e.g., 337-*a* and 337-*b*) or other type of key that engage one or more groove 378 extending axially along the wall of the central passage 333, thereby prevent relative rotation between either of the first or second shift rings 324-*a* and 324-*b* and the clutch body 322. As such, the first and second shift rings 324-*a* and 324-*b* rotate in synchrony with rotation of the clutch body 322.

Referring back to FIGS. 4B and 5, the first (or input) clutch engagement member may be rotatably coupled to the input rotor via a first alignment member 323-*a* and the second (or output) clutch engagement member may be rotatably coupled to the output rotor via a second alignment member 323-*b*. The first alignment member 323-*a* includes a stub shaft that extends into and is axially aligned with the rotor 302 and a flange that is coupled (e.g., sandwiched) between the input roller cage 328-*a* and the input shift ring 324-*a*. The stub shaft of the first alignment member is rotatably coupled (e.g., via one or more bearings) to the second side 312-2 of the input rotor 302 thereby rotatably coupling the input selector to the input rotor 302. The second alignment member includes a stub shaft aligned and extending in the opposite direction, that is, into the output rotor 316, and a flange that is coupled (e.g., sandwiched) between the output roller cage 328-*b* and the output shift ring 324-*b*. The stub shaft of the second alignment member is rotatably coupled (e.g., via one or more bearings) to the first side 312-2 of the output rotor 316 thereby rotatably coupling the output selector to the output rotor 316. The alignment members 323-*a* and 323-*b* may thus facilitate the axial alignment between the input and output rotors 302 and 316, respectively, while allowing them to be disengaged from (e.g., rotate relative to) one another.

Referring again to FIGS. 6-8 and now also to FIGS. 9-12, The cam surfaces 330-*a* and 330-*b* include a respective number of roller seats 346 corresponding to the number of rollers 326 on a given side of the clutch assembly. While an equal number of rollers 326 is shown here on both the input and output sides, in some embodiments, the two sides may have a different number of rollers 326. Each seat 346 includes a central portion 341 that is sufficiently spaced apart from the drum surface (as shown e.g., in FIG. 10) to accommodate a roller 326 and allow the roller 326 to rotate relative to the seat 346. Each seat 346 also includes, on each of the opposite sides of the central portion 341, ramped portions 344-1 and 344-2. Each of the ramp portions 344-1 and 344-2 are inclined toward the drum surface to decrease the distance between the cam surface and the drum surface. As such, when a roller 326 is positioned to bear against a ramp portion, the roller 326 cannot rotate freely relative to the seat 346 but instead exerts a force against the cam surface (e.g., bearing against the ramp portion) and the drum surface thereby rotatably engaging or coupling the two surfaces, causing the two surfaces to rotate in synchrony. The rollers 326 may be operatively coupled to the roller cage (e.g., input and output roller cages 328-*a* or 328-*b*), for example being retained at predetermined radial positions, in some cases equally spaced along the perimeter of the roller cage, by any suitable mechanism such as by spacers 348, pins pivotally coupling individual rollers 326 to the roller cage, or a combination thereof. Each of the roller cages (e.g., the input roller cage 328-*a* and the output roller cage 328-*b*) is coupled to rotate with the clutch body 322 and as such the roller 326 rotate with the clutch body 322 by virtue of being coupled to the roller cage, and in some modes also spin about their axes relative to the roller cage when the given side (i.e., the input or output side) of the clutch assembly is disengaged. When the given side of the clutch 314 is engaged, the rollers 326 are prevented from rotation but instead frictionally engage or couple the rotation of one of the rotatable components (e.g., the input rotor 302) to another rotatable component (e.g., the clutch body 322 and thus to the torque ring 318).

Figure 9:
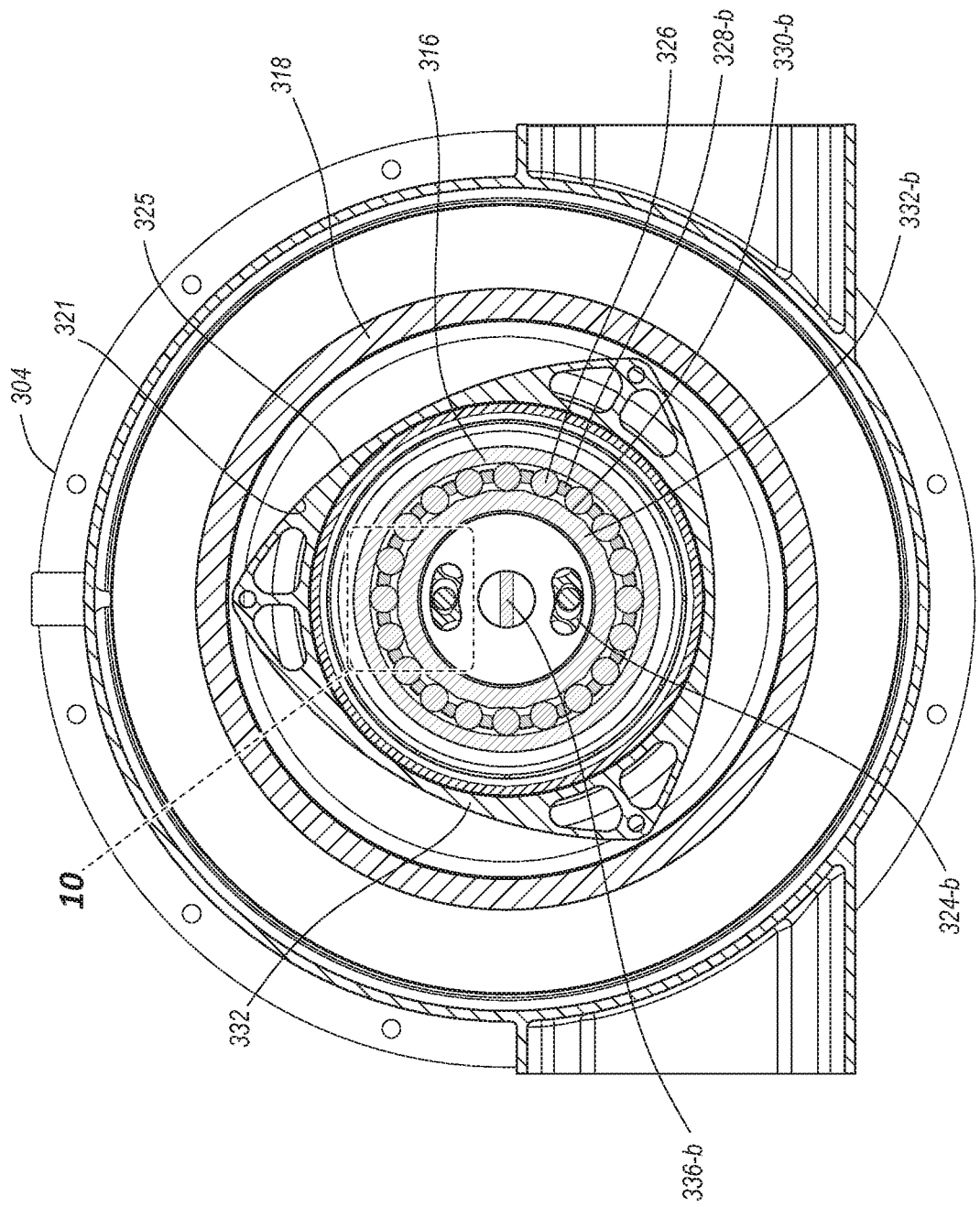
FIG. 9 is a section view of the transmission assembly taken at section line 9-9 in FIG. 4B.
Figure 10:
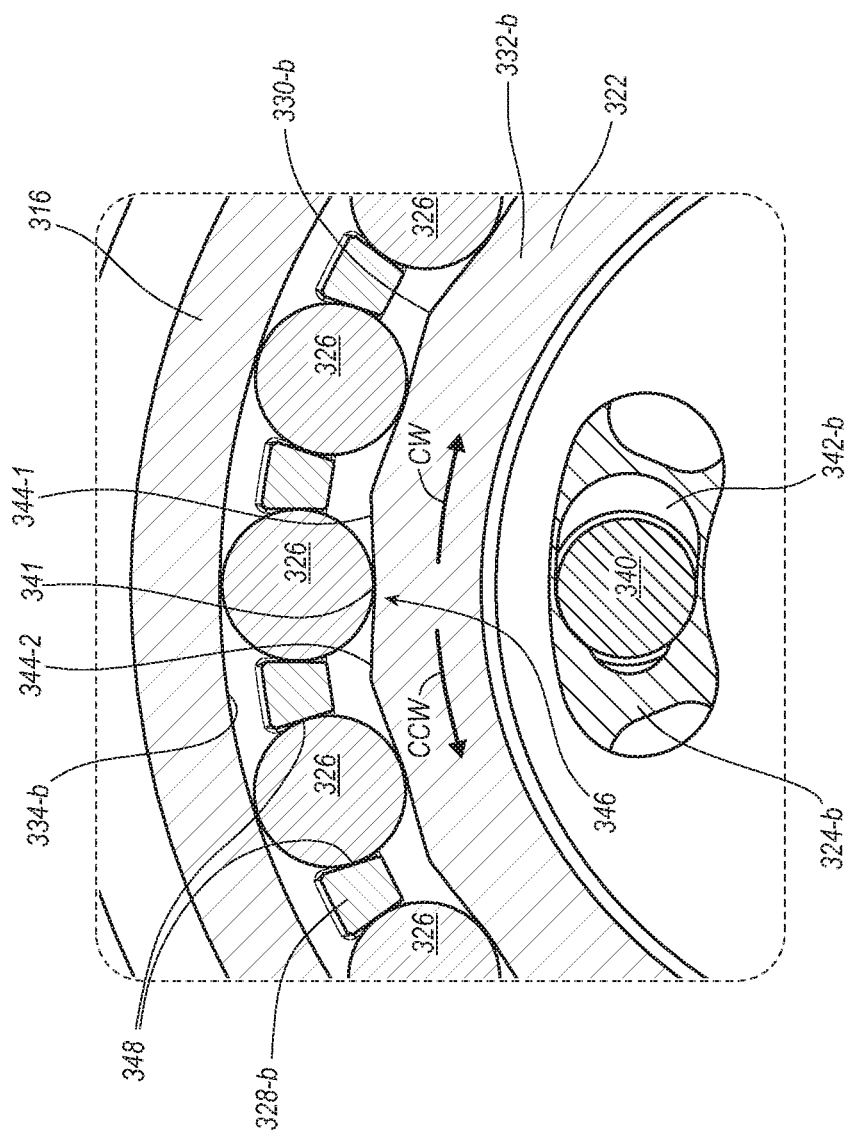
FIG. 10 is an enlarged view of the portion of the view in FIG. 9 indicated by box 10 in FIG. 9, with the clutch provided in one configuration.
Figure 11:
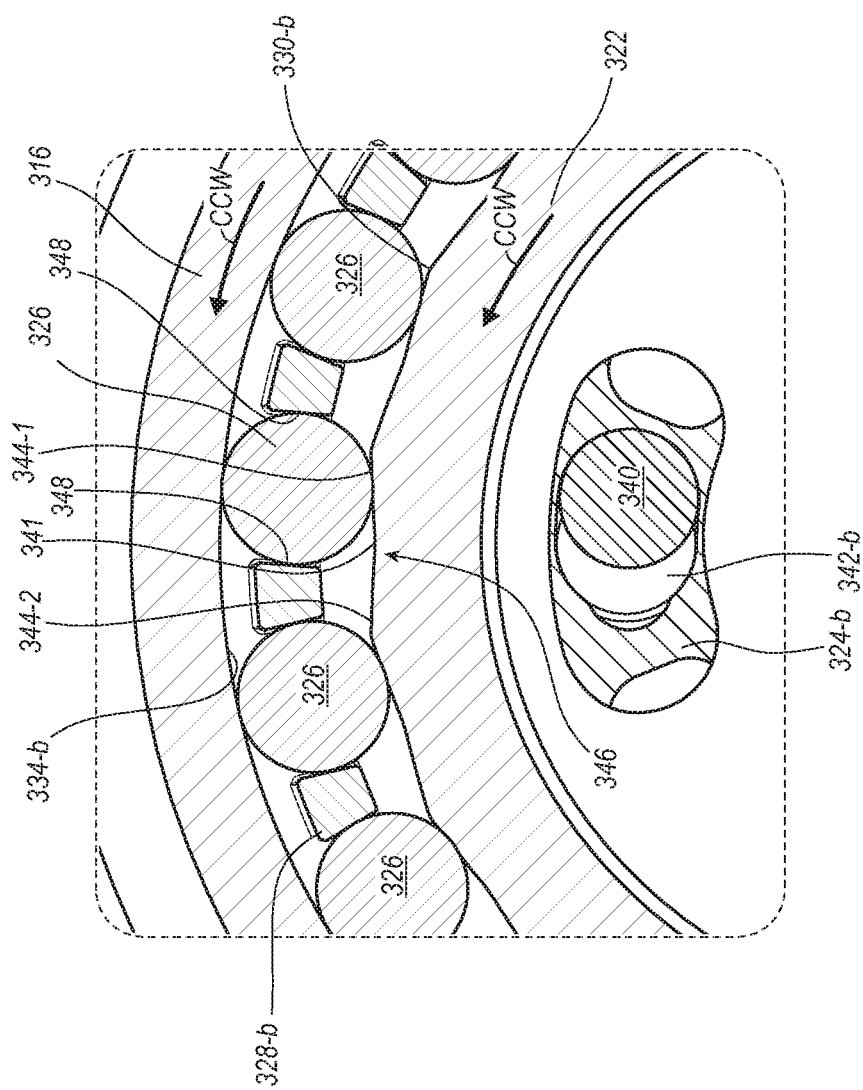
FIG. 11 shows the same portion of the transmission assembly as shown in FIG. 10 but with the clutch shown in another configuration different from that shown in FIG. 10.

For example, to illustrate the operation of the selectors, a radial sectional view through the output side 314-*b* of the clutch 314 is shown in FIG. 9, illustrating the transmission in a configuration in which the output rotor 316 is decoupled from the clutch body 322 and therefore no power is transmitted to the output of the transmission assembly. As shown in FIG. 9 and also in the enlarged partial view in FIG. 10, each of the rollers 326-*b* is positioned in the central portion 341 of its respective roller seat 346 and consequently each of the rollers 326-*b* is free to spin about its rotational axis within the space defined between the cam surface 330-*b* and the drum surface 334-*b* such that two surface and therefore the clutch body 322 and the output rotor 316 are rotationally decoupled. FIG. 11 shows the rollers rotationally shifted to one side of the central portion, for example on the ramp portion 344-1. The rollers 326 may be so shifted by rotating the roller cage in a first (e.g., counter clockwise or CCW) direction relative to the cam surface 330-*b*. By virtue of the rollers being retained at generally fixed radial positions of the roller cage (e.g., by the spacers 348 or by pins), rotating the roller cage in the first rotation direction also causes the rollers to rotate in that rotational direction relative to the cam surface 330-*b*. When the rollers are positioned, rotation of the cam surface 330-*b* of the clutch body 322 in a given direction (e.g., clockwise (CW)) causes synchronous rotation (e.g., in the same direction, here clockwise) of the drum surface of the output rotor 316. Rotating the cam surface in the opposite direction may return the rollers to the central portion of the seat either disengaging the output rotor (e.g., to provide the transmission in neutral mode) or to shift the rotation of the output rotor to the opposite direction (e.g., for switching between forward and reverse drive).

Figure 12:
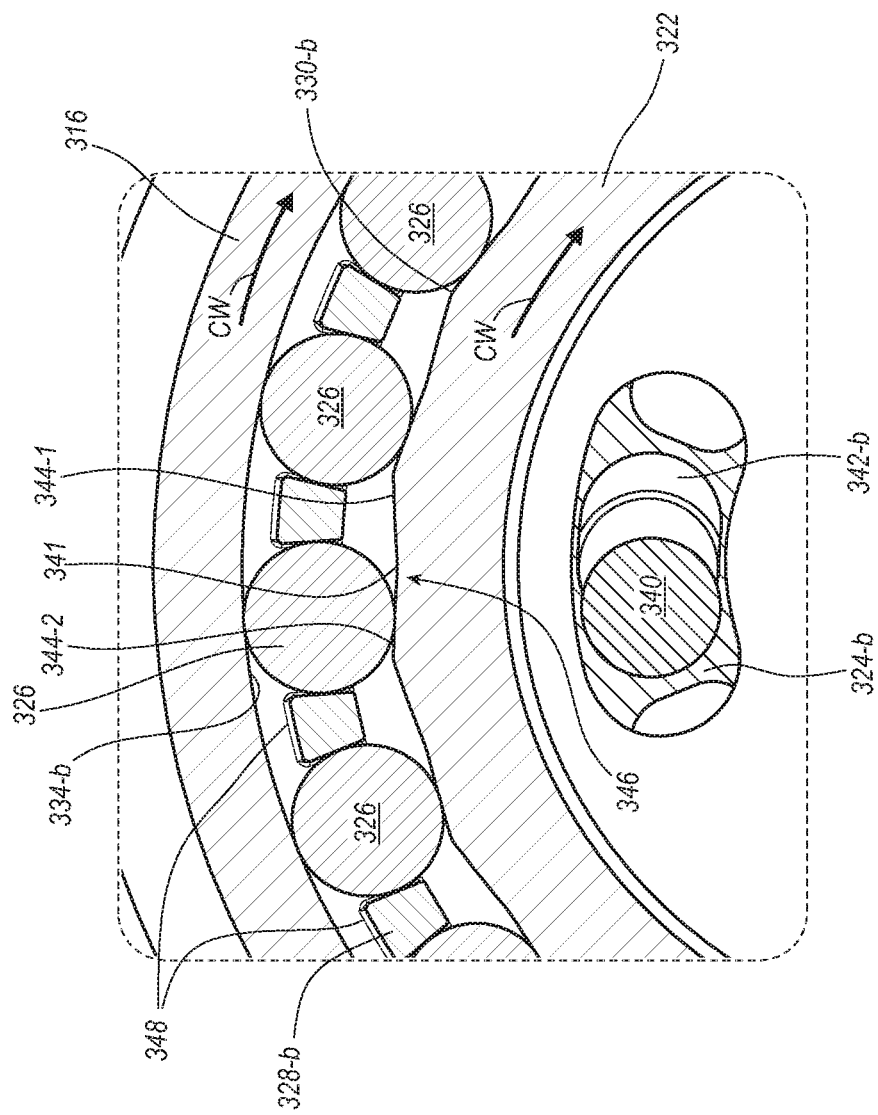
FIG. 12 also shows the same portion of the transmission assembly as shown in FIGS. 10 and 11 but with the clutch in yet another configuration different from that shown in FIGS. 10 and 11.
Figure 13:
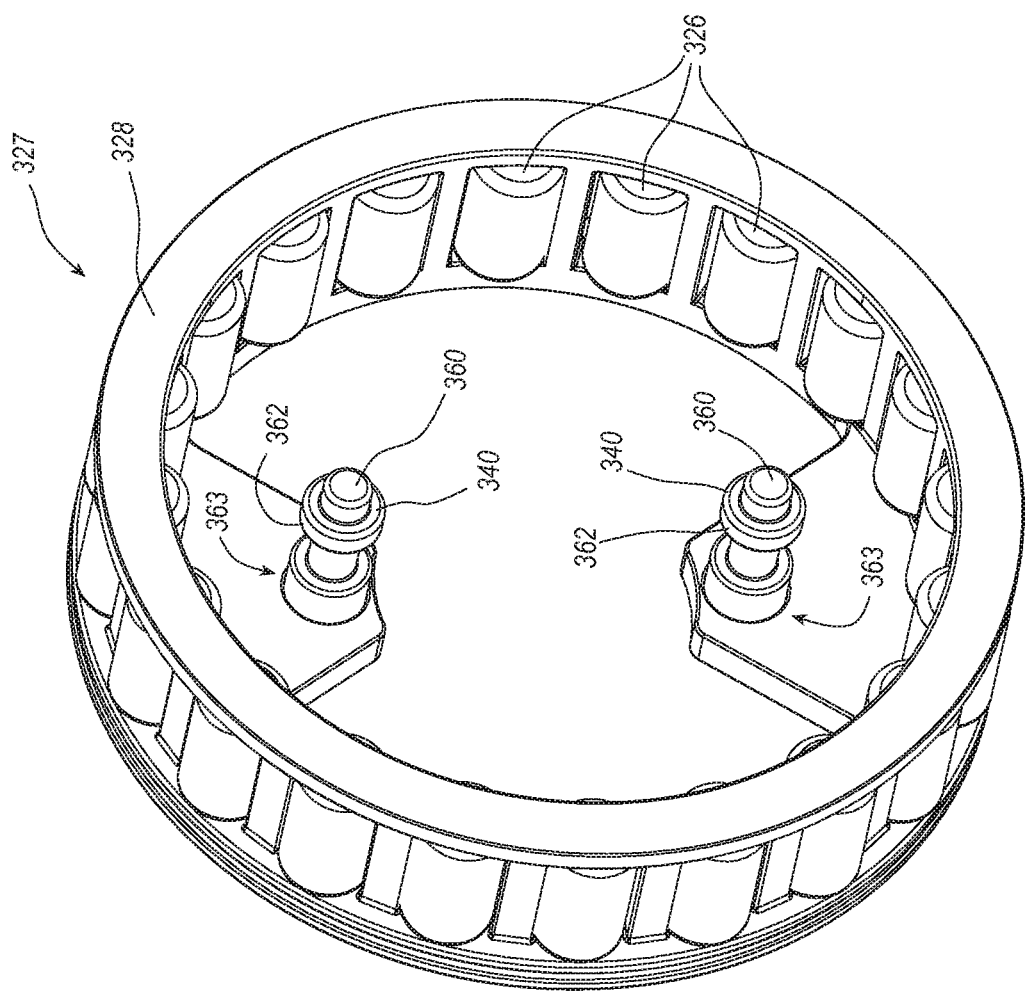
FIG. 13 shows a perspective view of a roller cage as may be used in the clutch assembly of FIG. 4B.

FIG. 12 shows the rollers rotationally shifted in the opposite direction to bear against the opposite side of the central portions (e.g., the ramp surfaces 344-2). In this configuration, rotation of the cam surface 330-*b* in an opposite (e.g., CW) direction causes the rollers, through friction between the rollers and the opposing cam and drum surfaces to couple the rotation of the cam surface to the output rotor whereby the output rotor may be rotated in the CW direction. As previously described, the output rotor may be rotatable in one direction, for example the forward direction by either one or the input rotors and the torque ring, or by both of them concurrently, while the output rotor may be rotatable in the opposite direction (e.g., reverse) by only one of the inputs (e.g., the torque ring), eliminating the complexity and weight associated with the gear assembly that may be needed to reverse the rotation of the prime mover shaft. The clutch 314 may be referred to as a bi-directional clutch by virtue of allowing the output side 314-*b* of the clutch assembly 314 to couple rotation to the output, via the same clutch mechanism, in either a forward or a reverse direction.

While described here with reference to the output side 314-*b*, it will be understood that the input selector operates in the same manner to shift the clutch between positions in which the input rotor is coupled to the clutch body and thus to the torque ring and a position in which the input rotor is de-coupled from the clutch body and thus from the torque ring. When the input rotor is coupled to the clutch body and thus to the torque ring the input rotor rotates with the torque ring. On the output side, if the clutch body is decoupled from the output rotor, the transmission is configured to operate in the generation mode 212 in which power from the input rotor may be converted to electrical energy. If the output side of the clutch body is coupled to the output rotor and the torque ring is operating in motor mode, the transmission operates in boost mode 208, with power from the torque ring supplementing the power provided by the input rotor. If the output side of the clutch body is coupled to the output rotor and the torque ring is operating in generator mode, the transmission is configured to operate in mode 214 in which a portion of the power from the input motor is converted to electrical energy (e.g., for concurrent or later use). When the input rotor is decoupled from the clutch body and the clutch body is decoupled from the output rotor, the transmission is provided in the neutral mode 202. If the input rotor is decoupled from the clutch body 322 on the input side but the clutch body 322 is coupled to the output rotor on the output side, the torque ring 318 may rotate the output rotor in electric drive mode 204, either in a forward direction and/or in reverse in the case of a bi-direction secondary mover.

Referring now also to FIGS. 13-22, operation (e.g., shifting) of the clutch 314 will be further described. The selector or shifter mechanism (e.g., input selector or shifter 331-*a* and output selector or shifter 331-*b*) on each of the input and output sides 314-*a* and 314-*b*, respectively, of the clutch assembly 314 may include a clutch engagement member 327 (e.g., a plurality of rollers 326 retained by a roller cage 328) and a clutch shifting member 324 (e.g., a shift ring). The clutch shifting member (e.g., shift ring 324) may be movably coupled to the clutch engagement member 327 (e.g., the roller cage 328), for example to allow a predetermined amount of axial and rotational relative movement between the two. In some embodiments, the roller cage 328 is sized (e.g., has a diameter) to accommodate the shift ring 324 within. One or more pins 340 movably couple the clutch engagement member (e.g., the roller cage 328) to the clutch shifting member (e.g., shift ring 324). The pins 340 may be provided on one of the engagement member (e.g., the roller cage 328) and the clutch shifting member (e.g., shift ring 324) and extend toward to be received in a passage or cavity provided on the other one of the engagement member (e.g., the roller cage 328) or the clutch shifting member (e.g., shift ring 324). Referring to the embodiment in FIGS. 13-15, the one or more pins 340 are fixed to the roller cage 328 such that they extend toward the shift ring 324, with the one or more corresponding passages 342 being provided on the shift ring 324. In other embodiments the location of the one or more pins 340 and one or more passages 342 may be reversed. Each pin 340 includes an enlarged flange portion 362 which is offset from the tip portion 360 towards the base 363 of the pin. As such, a first portion of the pin (e.g., the tip portion 360) has a smaller dimension (e.g., diameter)

than a second portion of the pin adjacent thereto (e.g., the flange portion 362). The pin(s) 340 may extend along a direction parallel to the rotational axis X. In some embodiments, the pin(s) 340 may be coupled to respective tabs extending radially inward from the peripheral or cage portion of the roller cage 328 to operatively position the pin(s) 340 for engagement with the shift ring 324. Each pin 340 is received in a corresponding axial passage 342.

Figure 14:
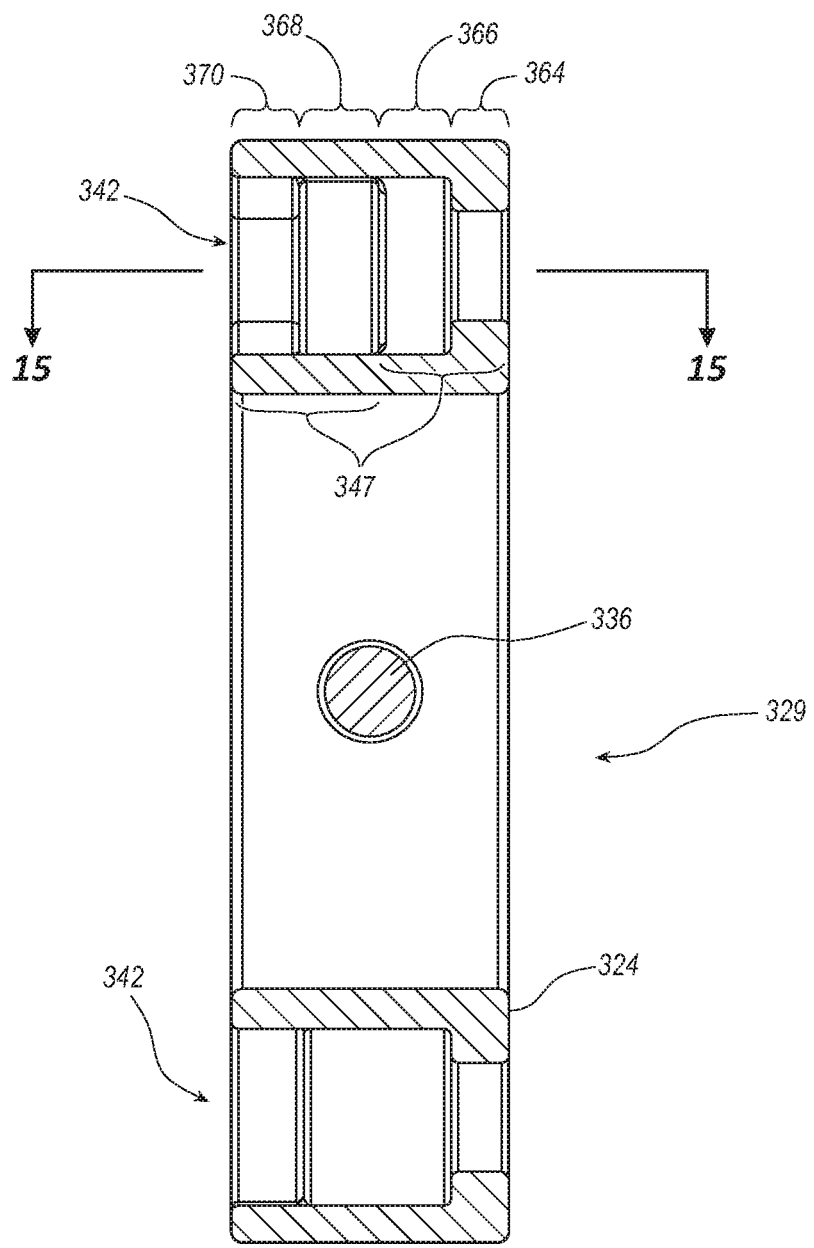
FIG. 14 shows a side section view of a shift ring as may be used in the clutch assembly of FIG. 4B.
Figure 15:
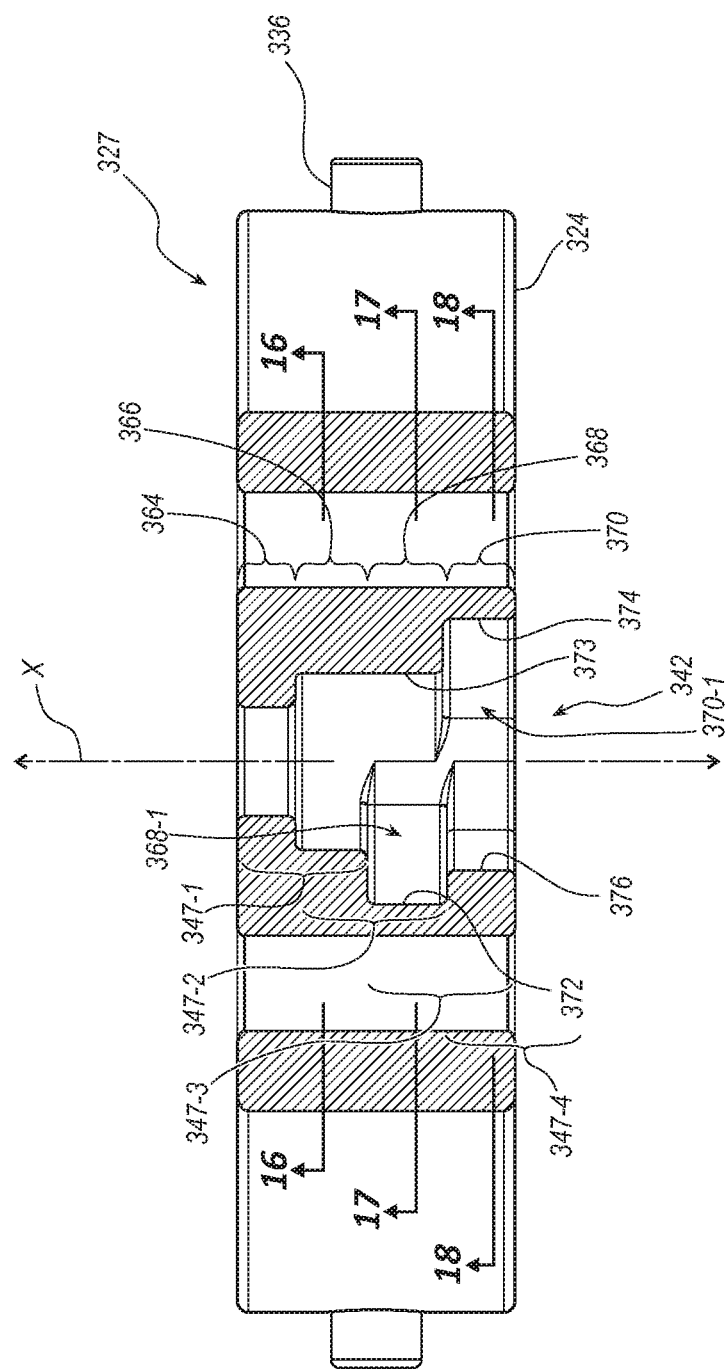
FIG. 15 shows another cross-sectional view of the shift ring of FIG. 14 taken through section lines 15-15 in FIG. 14.

As shown in FIGS. 14 and 15, the shift ring 324 may include a corresponding axial passage 342 for each of the pin(s) 340. The axial passage(s) 342 may be radially offset from the rotational axis (i.e. axis X) of the shift ring 324 to receive the corresponding pin 340. In some embodiments, multiple (e.g., two) such axial passages 342 may be provided, one corresponding to each of the pins. Each of the pair of axial passages 342 may be provided at diametrically opposite locations on the shift ring 324.

Each of the axial passages 324 may be irregularly shaped (e.g., non-circular) along the axial direction so as to define a plurality of discrete axial engagement positions (e.g., engagement positions 347-1, 347-2, 347-3, and 347-4) for the corresponding pin 340. In operation, the roller cage(s) 328 remains in a substantially fixed axial position with respect to the rest of the clutch assembly (e.g., in relation to the clutch body 322), while the shift ring(s) 324 are movable axially relative to the roller cage(s) and the rest of the clutch assembly (e.g., clutch body 322). In addition to enabling a predefined amount of axial movement, the one or more axial passage(s) 342 are also configured, via the discrete axial engagement positions 347, to enable a predefined amount(s) of rotational movement of the roller cage 328 relative to the shift ring 324. Each of the discrete axial engagement positions 347 may enable a different rotational movement (e.g., a different amount or direction of rotational movement) of the roller cage 328 relative to the shift ring 324. Beyond the predetermined or predefined relative rotational movement between the roller cage 328 and shift ring 324, the rotation of the two may be synchronized. That is, the roller cage 328 may be capable of a limited amount of rotation relative to the shift ring 324, such as when coupling a rotor to the clutch body, beyond which any rotation of the roller cage 328 in the same direction would be transmitted to the shift ring 324, causing the shift ring 324 to rotate in synchrony with the roller cage 328. At each of the discrete axial engagement positions 347, the configuration of the axial passage 342 constrains the selector or shifter mechanism (e.g., input selector or shifter 331-a and output selector or shifter 331-b) on each of the input and output sides of clutch (e.g., into a different configuration or state (e.g., coupling or de-coupling a different combination of the rotors of the transmission). The discrete axial engagement positions 347 may be provided by a plurality of axial portions (e.g., axial portions 364, 366, 368, and 370) which permit a different amount and/or direction of relative rotational movement between the shift ring 324 and the roller cage 328 such that when the shift ring 324 is axially shifted between the different axial engagement positions (e.g., for engagement of the pin 340 and axial passage 342), the roller cage 328 may be constrained to different rotational movement relative to the shift ring 324.

Figure 16:
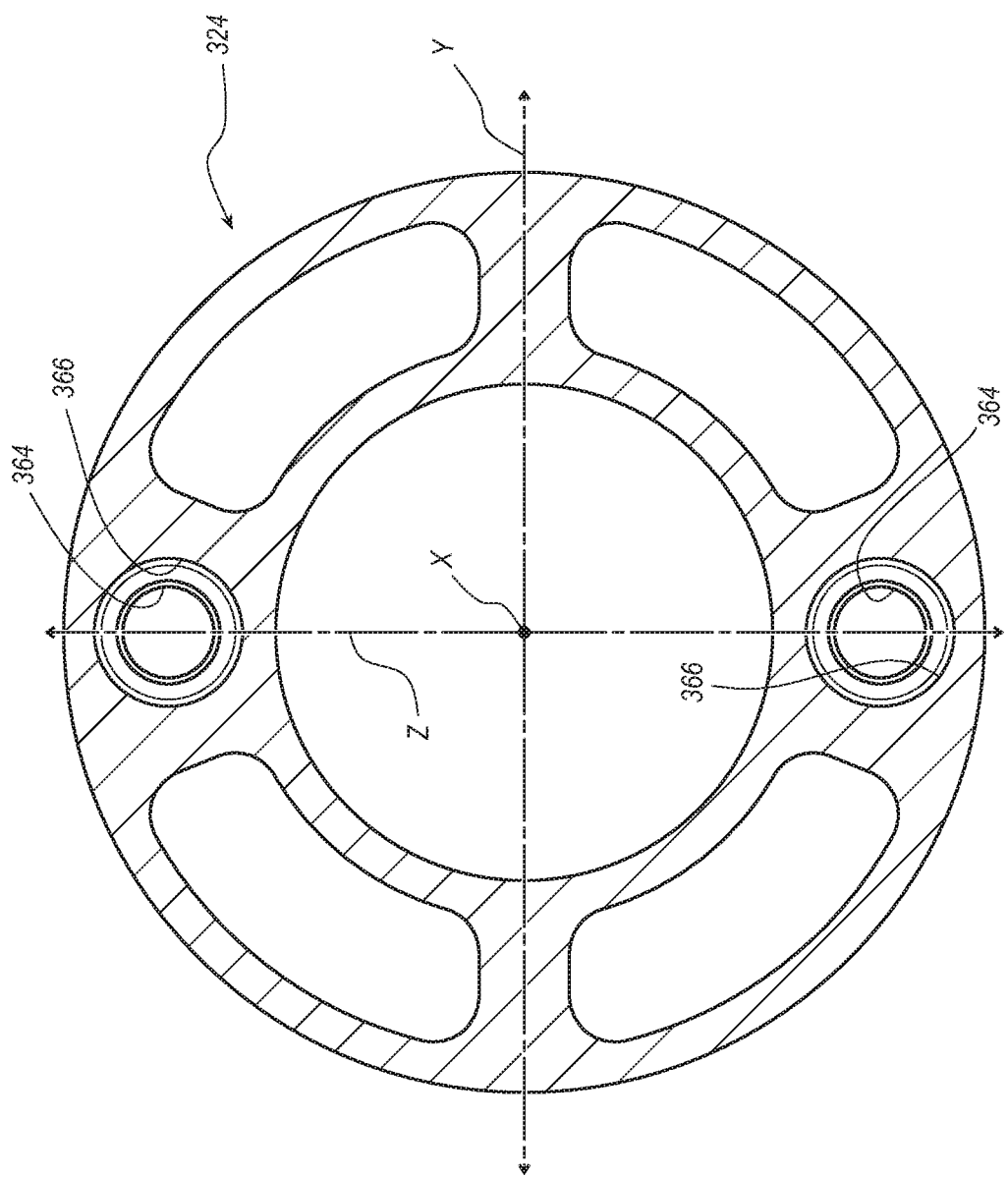
FIG. 16 shows a further cross-sectional view of the shift ring of FIG. 15 taken through section lines 16-16 in FIG. 15.
Figure 19:
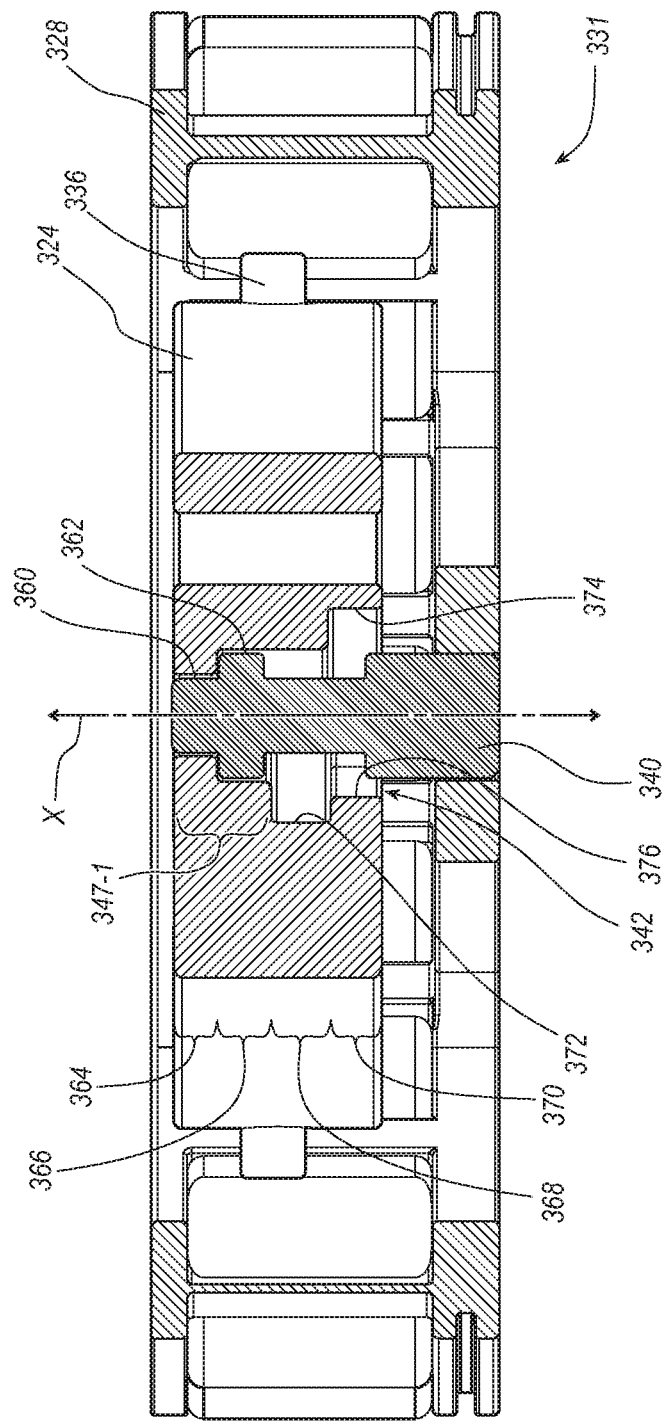
FIG. 19 shows a side section view of a selector mechanism as may be used in the clutch assembly of FIG. 4B, the selector mechanism including a shift ring and roller cage and provided in a first configuration.

In embodiments of the present disclosure, each passage 324 may include a plurality of differently dimensioned axial portions that provide the plurality of axial engagement positions, for example a first axial portion 364, a second axial portion 366, a third axial portion 368, and a fourth axial portion 370. The first axial portion 364 may be the axial portion of the passage 324 located farthest away, along the axial direction, from the base of the pin 340. The first axial portion 364 may be sized such that the tip portion 360 of the pin just fits (e.g., in a clearance fit) within the first axial portion 364, whereby substantially any relative rotational movement between the shift ring and the roller cage is prevented or constrained via the cooperating fit between the first axial portion 364 and the tip portion 360 of the pin 340. As such, the rotation of the roller cage 328 and the shift ring 324 are synchronized. The second axial portion 366 may be sized such that the flange portion 362 of the pin just fits, e.g., in a clearance fit, within the second axial portion 366. As such, the second axial portion may have a shape that substantially corresponds to the shape of the flange portion, whereby relative rotational movement between the shift ring and the roller cage is substantially prevented. Axially aligning the pin 340 such that its tip portion 360 is positioned in the first axial portion 364 of the passage 342 and the flange portion 362 is positioned in the second axial portion 366 of the passage 342 may correspond to the first axial engagement position 347-1. In this position, relative rotation between the roller cage 328 and the shift ring 324 may be substantially prevented not only by the cooperating fit between the tip portion 360 and the first axial portion 364 but also by the cooperating fit between the flange portion 362 and the second axial portion 366 of the passage 324. The first axial engagement position may position and maintain the roller cage 328 in a rotational position relative to the cam surface 321 in which the rollers 326 are aligned or positioned in the central portions 341 of the seats 346. Thus, the first axial engagement position 347-1 may rotationally decouple the clutch body 322 from the respective rotor (e.g., input rotor 302 or output rotor 316), as shown e.g., in FIG. 10 and no torque is transferred between the rotor and the clutch body. Both the first and second axial portions 364 and 366 may be centered with respect to the axial direction (as can be seen in FIGS. 15, 16, and 19), in that the passage 342 extends a substantially equal amount on both sides of a plane Z extending perpendicularly to the axial direction X (i.e., into and out of the page in FIG. 15). As such, when the one or more pins 340 are provided in the first axial engagement position 347-1, as shown in FIG. 19, the one or more pins 340 are substantially centered with the axial direction X. In embodiments in which the shift ring 324 includes two axial passages 342, the two axial passages may be at diametrically opposite locations defined by the Z plane as shown in FIG. 16.

Figure 17:
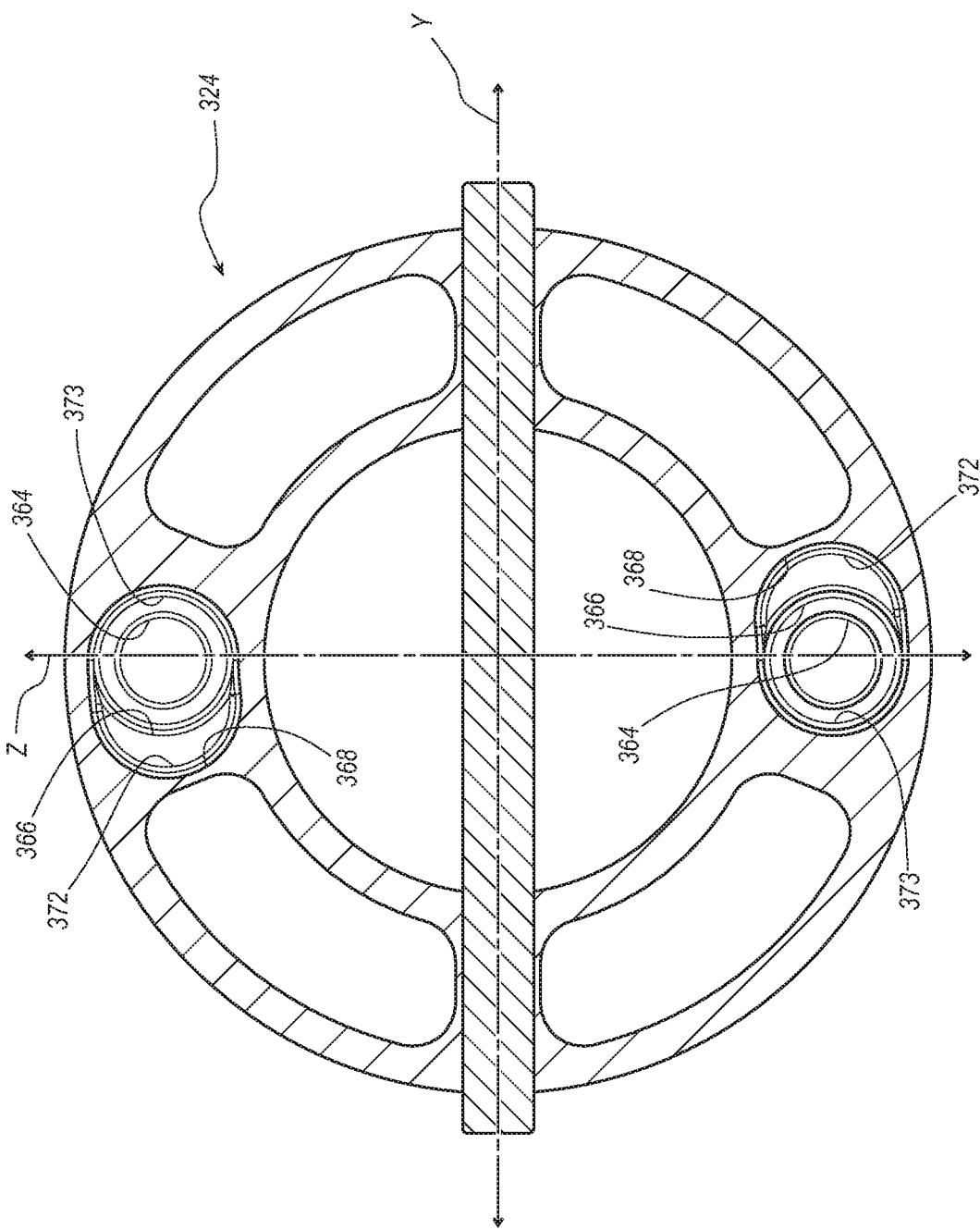
FIG. 17 shows another cross-sectional view of the shift ring of FIG. 15 taken through section lines 17-17 in FIG. 15.
Figure 18:
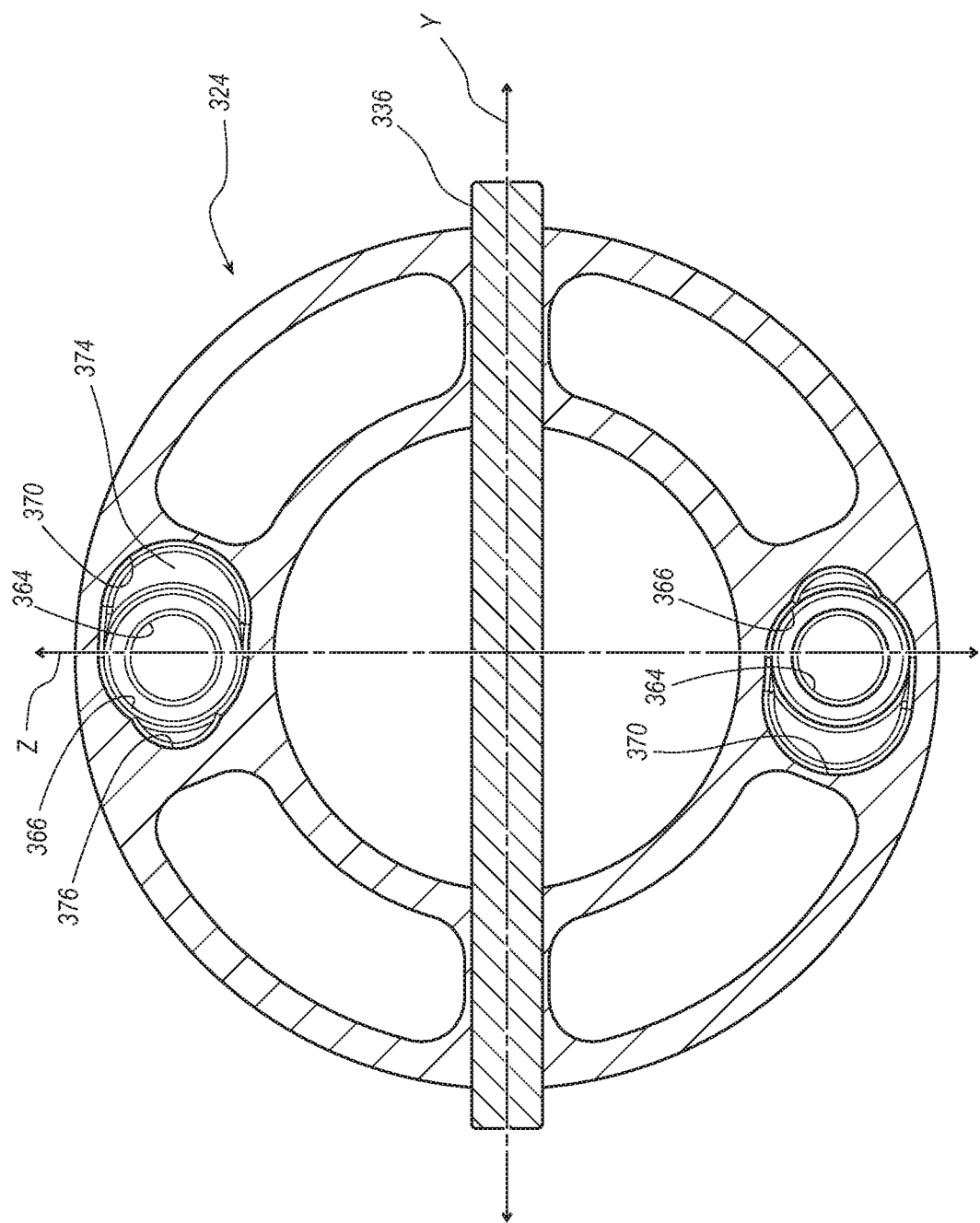
FIG. 18 shows yet another cross-sectional view of the shift ring of FIG. 15 taken through section lines 18-18 in FIG. 15.
Figure 20:
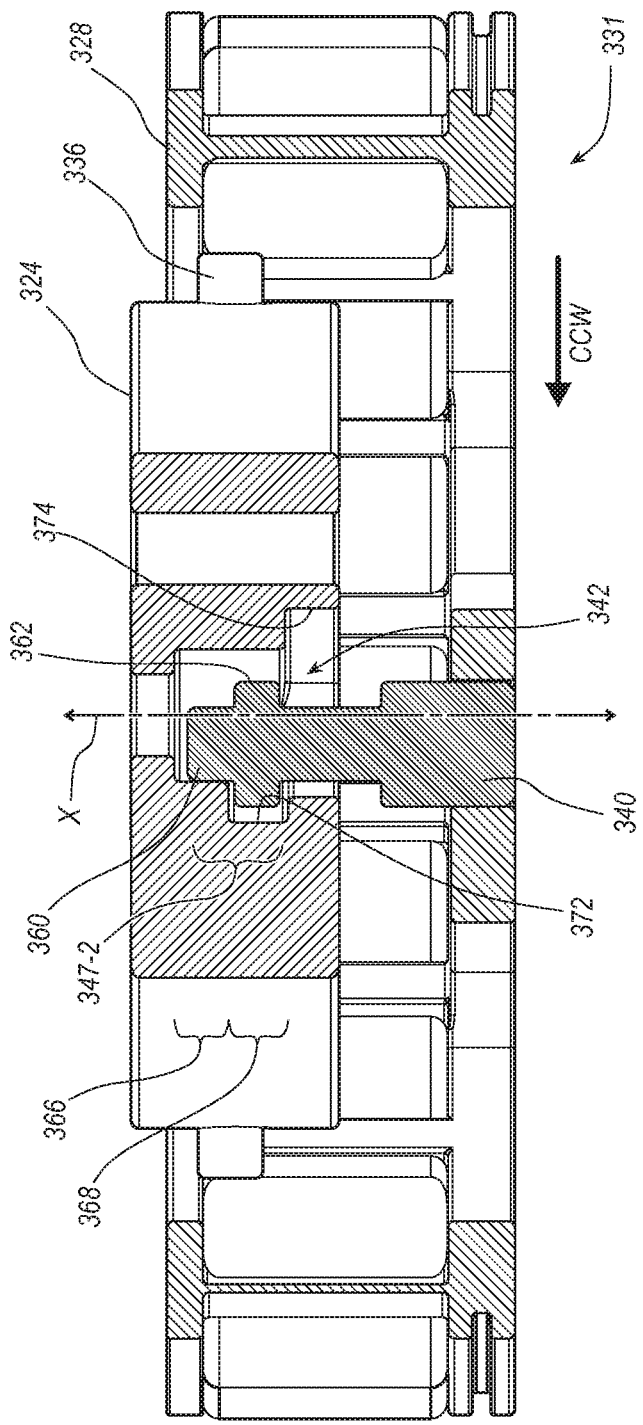
FIG. 20 shows a side section view of the selector mechanism in FIG. 19 provided in another configuration.

The second axial engagement position 347-2 may include the second axial portion 366 and a third axial portion 368, which is adjacent to the second axial portion 366 and has a different shape than the second axial portion 366. The third axial portion 368 of the passage may be wider than the second axial portion 366 such that the flange portion 362 of the pin 340 is movably accommodated within the third axial portion 368. When the flange portion 362 is positioned within (or axially aligned with) the third axial portion 368, the roller cage 328 can be rotated relative the shift ring 324 by a predetermined amount, before rotation of the roller cage 328 is transmitted to the shift ring 324 synchronizing it with the roller cage 328. The third axial portion 368 is off center with respect to the axial direction X. As can be seen in FIG. 15 and FIG. 17, one side (e.g., side wall 372) of the third axial portion 368 is spaced further from the Z plane than the opposite side (e.g., side wall 373), defining an off-center portion 368-1, which allows the pin 340 to shift off-center (as shown in FIG. 20) to force the roller cage 328 into a position in which the rollers 326 engage a ramped portion of the roller seats, as shown in FIG. 11. In embodiments in which the shift ring 324 includes two axial passages 342, the third axial portions 368 of the passages 342 are offset in opposite directions, as can be seen in FIG. 17.

Figure 21:
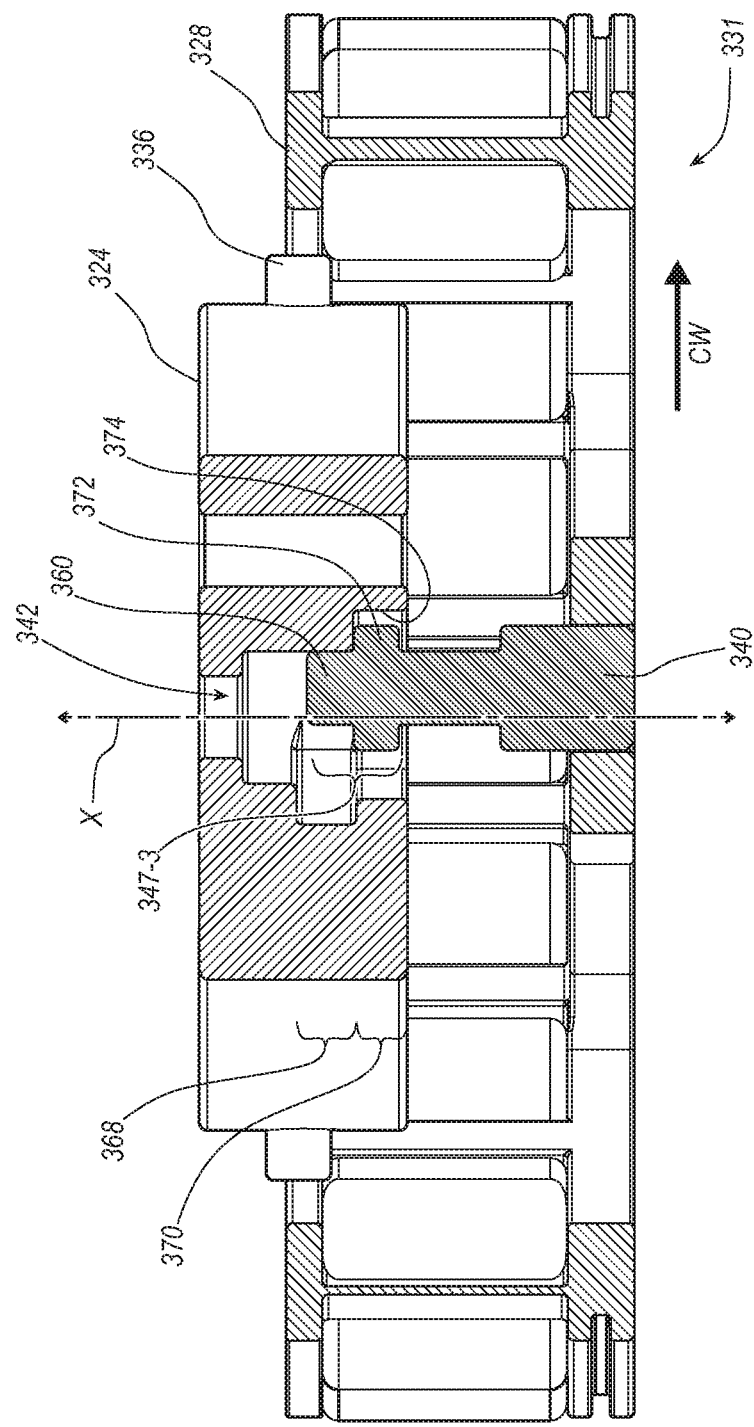
FIG. 21 shows a side section view of the selector mechanism in FIG. 19 provided in yet another configuration.

The third axial engagement position 347-3 may include the third axial portion 368 and a fourth axial portion 370, which is adjacent to the third axial portion 368 on the opposite side from the second axial portion 366. The fourth axial portion 368 is configured to force the roller cage 328 into a position in which the rollers 326 engage the opposite side of the central portion (e.g., the opposite ramped portion of the roller seats). To that end, the fourth axial portion 368 includes an off-center portion 370-1 defined by side wall 374, which is offset or spaced from plane Z by substantially the same distance as the side wall 372 but from the opposite side of plane Z, to permit a relative rotation between the roller cage 328 and the shift ring 324 of substantially the same amount as in the second axial engagement position but in the opposite direction. When aligned with the third axial engagement position 347-3, the roller cage 328 is forced into a position in which the rollers 326 engage the opposite ramped portions of the roller seats (e.g., as shown in FIGS. 12 and 21). The second and third axial engagement positions can be used to rotationally couple the input and/or output rotor to the respective side of the clutch body, depending on the rotational direction of the rotor. For example, if the input rotor 302 rotates in a counter-clockwise direction CCW, the selector mechanism 331 on the input side may be provided in the second axial engagement position 347-2 (as shown in FIG. 20) and the selector mechanism 331 on the output side may be provided in the third axial engagement position 347-3 (as shown in FIG. 21) to couple the CCW rotation of the input rotor 302 to the output rotor 316 for rotating the output rotor 316 in synchrony with the rotation of the input rotor 302. Conversely, if the input rotor 302 rotates in a clockwise direction CW, the selector mechanism 331 on the input side may be provided in the third axial engagement position 347-3 (as shown in FIG. 21) and the selector mechanism 331 on the output side may be provided in the second axial engagement position 347-2 (as shown in FIG. 20) to couple the CW rotation of the input rotor 302 to synchronously rotate the output rotor 316.

Figure 22:
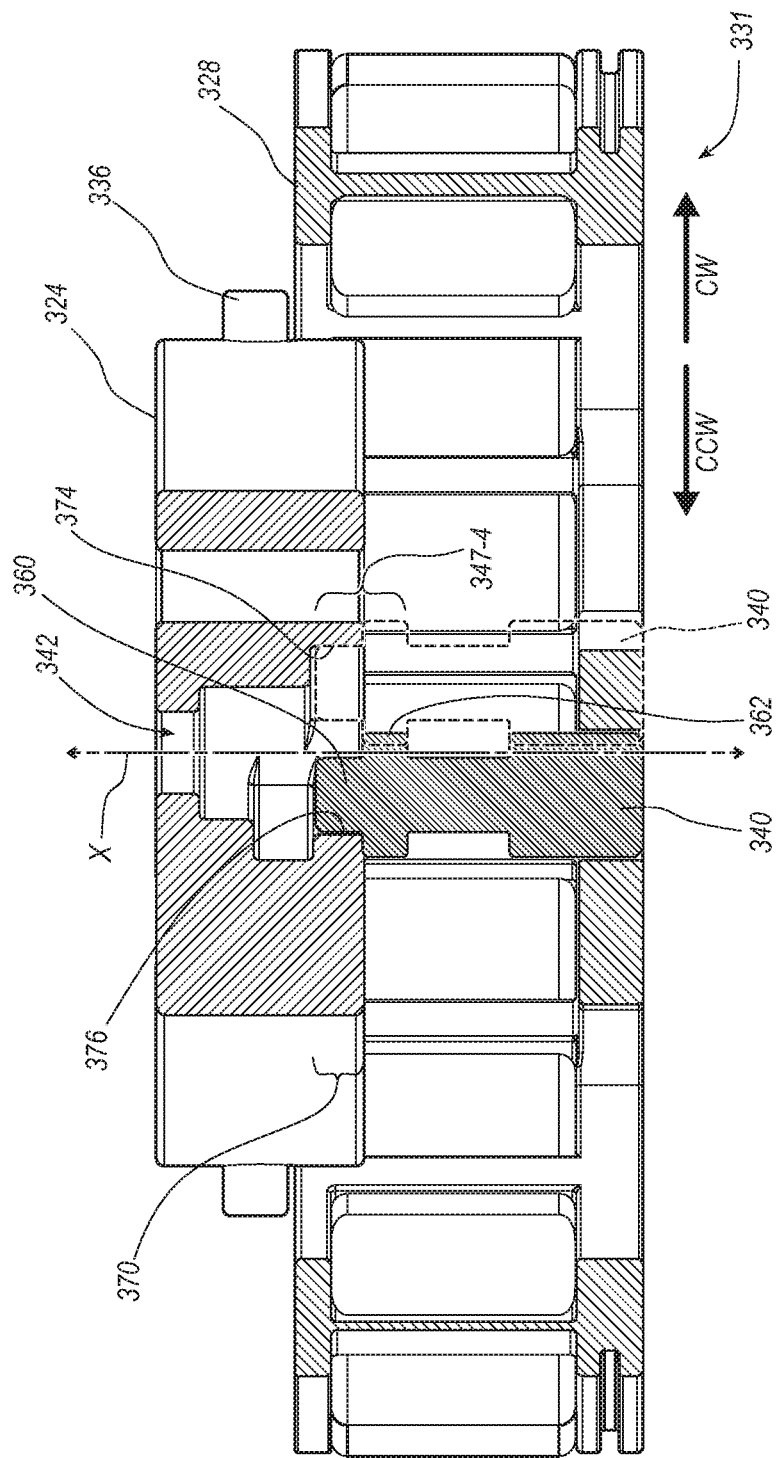
FIG. 22 shows a side section view of the selector mechanism in FIG. 19 provided in yet another configuration.

The fourth axial portion 370 may also be sized to accommodate sufficient rotational movement of the tip portion 360 of the pin 340, as shown in FIG. 22, to enable the shifting of the roller cage 328 to either the clockwise or counter-clockwise engagement configuration, thereby defining the fourth axial engagement position 347-4 of the shifter ring. In the fourth axial engagement position 347-4, the tip portion 360 of the pin 340 is within the axial passage 342 but the flange portion 362 is outside of the passage 342, whereby the rotational movement of the roller cage 328 relative to the shift ring 324 is constrained only by the fourth axial portion 370 of the axial passage 342. The second axial engagement position and/or the third axial engagement position can also be used to rotationally couple the output rotor to the rotation of the clutch body, again depending on the direction of rotation of the clutch body. In some embodiments, such as in the case of a bi-directional mover (e.g., a bi-directional electric motor that can rotate a rotor 112 in opposite directions), the fourth axial engagement position may be used to couple the rotation of the rotor to the output rotor in order to drive the output rotor in either a clockwise or counter-clockwise direction by simply reversing the rotation of the rotor without shifting the clutch.

Referring back to the various operational modes of the hybrid power plant in FIGS. 2A-2F, a neutral mode 202 may be achieved by configuring both the input selector 331-*a* and the output selector 331-*b* to the first axial engagement position of the respective shift ring 324. A secondary drive mode in which the output rotor is driven only by the secondary mover, as shown e.g., in FIG. 2B, may be achieved by decoupling the input rotor such as by providing the input selector 331-*a* (e.g., input shift ring 324-*a*) in the first axial engagement position and providing the output selector (e.g., output shift ring 324-*b*) in either the second, third, or fourth axial engagement position depending on whether the secondary mover is a bi-directional mover operable in two (forward and reverse) sub-modes of operation. Modes 206, 208, and 214, may be achieved by configuring the input selector 331-*a* (e.g., input shift ring 324-*a*) in either the second axial engagement position or the third axial engagement position, depending on the rotational direction of the primary mover's shaft, and providing the output selector (e.g., output shift ring 324-*b*) in the other one the second axial engagement position or the third axial engagement position since the input and output selectors are mirror image of one another when assembled into the transmission. In mode 206 shown in FIG. 2C, the secondary mover does not operate (e.g., it does not source or generate power) and as such only the primary mover drives the rotation of the clutch body and the output rotor. In mode 208 shown in FIG. 2D, the secondary mover (e.g., electric motor-generator) is operated in drive mode sourcing energy to generate mechanical power in the form of supplementing the rotation of the clutch body, while in mode 214 shown in FIG. 2F the secondary mover (e.g., electric motor-generator) is operated in generator mode to convert some of the mechanical energy from the primary mover into electrical energy. In either of these three modes, the clutch configuration may be the same. In the pure generation mode, shown as mode 212 in FIG. 2E, the input selector (e.g., input shift ring 324-*a*) in provided in either the second or third axial engagement position, depending on the rotation of the primary mover's shaft and the output selector (e.g., output shift ring 324-*b*) is provided in the first axial engagement position, which rotationally decouples the output rotor from the clutch body such that the mechanical energy of the input rotor is used for generating energy (e.g., electrical energy) by the secondary mover (e.g., an electrical motor-generator).

As previously noted, the shifting of the selector mechanism 331 between the different axial engagement positions and thus between the different states (e.g., the neutral, counterclockwise drive, clockwise drive, or bi-directional drive states, shown in FIGS. 19-20, respectively) may be achieved responsive to control by a shifter assembly 305, which includes a shifter rod 350. Referring back to FIG. 4B, the shifter rod 350 may include a first rod 352 connected to the selector mechanism 331 on the input side of the clutch, and a second rod 350 connected to the selector mechanism 331 on the output side of the clutch. The first rod 352 may be connected, at its distal end, to a first slider 354 and the second rod 350 may be connected, at its distal end, to a second slider 356. The sliders 354 and 356 may be configured to move axially (e.g., slide) within the shifter housing 306 responsive to a control input, which may be manual (e.g., via one or more levers and/or gears), or electronic. The first and second rods 352 and 350 may be connected, at their opposite ends, to the respective shift ring, for example via a transverse shaft (e.g., 336-*a* and 336-*b*) that passes through the rod and connects at opposite ends to the respective ring. Each of the shift rings may be configured to remain, at least partially, within the central passage 333 irrespective of the axial position they are provided in via the shift rod 351. The rods may be fixed to the shift rings such that they rotate in synchrony with their respective ring. The sliders 354 and 356 may be controlled to move independently of one another, to provide each of the sliders, and thus the corresponding rod, in any one of a plurality (e.g., four or a different number) of discrete axial positions, thereby shifting the respective selector mechanism 331 into any one of the described states for selectively rotationally coupling the input and/or output rotors to the clutch body.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

What is claimed is:

1. A transmission assembly for a hybrid power plant, comprising:
    a first input rotor driven by a primary mover to rotate about a first axis;
    a second input rotor co-axial with the first input rotor and driven by a secondary mover to rotate about the first axis;
    an output rotor co-axial with the first and second input rotors and configured to rotate about the first axis responsive to input from either the primary mover or the secondary mover; and
    a clutch positioned between the first and second input rotors and the output rotor and configurable in a first mode, a second mode, and a third mode;
    wherein in the first mode, the clutch couples the output rotor to the first input rotor without the output rotor being coupled to the second input rotor;
    wherein in the second mode, the clutch couples the output rotor to the second input rotor without the output rotor being coupled to the first input rotor; and
    wherein in the third mode, the clutch couples the output rotor to both the first input rotor and the second input rotor.

2. The transmission assembly of claim 1 further comprising a shifter rod connected to the clutch to shift the clutch between the first mode and the second mode.

3. The transmission assembly of claim 2, wherein the shifter rod extends along the first axis.

4. The transmission assembly of claim 3, wherein the first input rotor and the output rotor are spaced apart from one another with a second side of the first input rotor facing a first side of the output rotor, wherein the shifter rod extends from a second side of the output rotor through a central passage in the output rotor to the first side of the output rotor for operatively connecting to the clutch.

5. The transmission assembly of claim 3, wherein the clutch includes an input selector and an output selector.

6. The transmission assembly of claim 5, wherein the shifter rod includes a first rod connected to the input selector and a second rod connected to the output selector.

7. The transmission assembly of claim 6, wherein the second rod is inserted into the first rod.

8. The transmission assembly of claim 1, wherein the output rotor is rotatable in a first direction responsive to input from the first input rotor, the second input rotor, or both, and wherein the output rotor is rotatable in a second direction opposite the first direction responsive to input from only the second input rotor.

9. The transmission assembly of claim 8, wherein, in at least one mode, the output rotor is rotatable in the first direction or in the second direction responsive to input from only the secondary mover without any input from the primary mover.

10. The transmission assembly of claim 1, wherein the secondary mover is an electric motor-generator, and wherein the clutch is configurable to couple the first input rotor to the output rotor to drive the output rotor responsive to rotation of the first input rotor while also coupling the second input rotor to the rotation of the first input rotor for generating electrical energy by the electric motor-generator responsive to rotation of the first input rotor.

11. The transmission assembly of claim 1, wherein the first input rotor has an input drum surface, wherein the output rotor has an output drum surface, wherein the clutch comprises a cam having an input cam surface and an output cam surface, the input cam surface facing the input drum surface and the output cam surface facing the output drum surface.

12. The transmission assembly of claim 11, wherein the clutch further comprises an input selector having an input follower positioned between the input drum surface and the input cam surface, the input follower movable by the input selector between a first input configuration in which the input drum surface is rotatable relative to the input cam surface and a second input configuration in which rotation of the input drum surface causes rotation of the input cam surface.

13. The transmission assembly of claim 12, wherein the clutch further comprises an output selector having an output follower positioned between the output drum surface and the output cam surface, the output follower movable by the output selector between a first output configuration in which the output cam surface is rotatable relative to the output drum surface and a second output configuration in which rotation of the output cam surface causes rotation of the output drum surface.

14. The transmission assembly of claim 13, wherein each of the input and followers comprises a plurality of rollers circumferentially spaced around the respective input or output cam surface.

15. The transmission assembly of claim 14, wherein the input selector comprises a first rod and the output selector comprises a second rod axially aligned with the first rod.

16. The transmission assembly of claim 15, wherein the second rod extends at least partially through a length of the first rod.

17. The transmission assembly of claim 11, wherein the cam is fixed to the second input rotor such that the cam rotates in synchrony with the second input rotor.

18. A marine vessel having a hybrid propulsion system, comprising:
    a primary mover located within a hull of the vessel and powered by a first energy source, the primary mover having a shaft that rotates about a first axis;
    a secondary mover powered by a second energy source different from the first energy source;
    a transmission assembly comprising;
        a first rotor coupled to the shaft to rotate in synchrony with the shaft;
        a second rotor selectively driven by the secondary mover and co-axial with the first input rotor;

an output rotor co-axial with the first and second rotors; and a clutch positioned between the first and second rotors and the output rotor and operable between a first mode to transfer rotation of the first rotor to the output rotor while the output rotor is decoupled from the second rotor, a second mode to transfer rotation of the second rotor to the output rotor while the output rotor is decoupled from the first rotor, and a third mode to transfer rotation of the first rotor and the second rotor to the output rotor.

19. The marine vessel of claim 18, wherein the first rotor and the second rotor are at least partially enclosed within a same housing.

20. The marine vessel of claim 18, wherein, when in the first mode, the first rotor rotates with the output rotor.

21. The marine vessel of claim 18, wherein the clutch is operable in a fourth mode to transfer rotation of the first rotor to the second rotor.

22. The marine vessel of claim 18, wherein, when in the third mode, the first rotor, the second rotor, and the output rotor rotate together.

23. The marine vessel of claim 18, wherein the primary mover is a combustion engine and the secondary mover is an electric motor.

24. The marine vessel of claim 18, wherein the transmission assembly further comprises a single-speed or multi-speed gearbox operatively associated with the output rotor.

* * * * *